(12) United States Patent
Hsu et al.

(10) Patent No.: US 10,996,430 B2
(45) Date of Patent: May 4, 2021

(54) OPTICAL IMAGING LENS

(71) Applicant: GENIUS ELECTRONIC OPTICAL CO., LTD., Taichung (TW)

(72) Inventors: Sheng-Wei Hsu, Taichung (TW); Pei-Chi Wang, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 225 days.

(21) Appl. No.: 16/355,855

(22) Filed: Mar. 18, 2019

(65) Prior Publication Data

US 2020/0209526 A1 Jul. 2, 2020

(30) Foreign Application Priority Data

Dec. 28, 2018 (CN) .......................... 201811624477.1

(51) Int. Cl.
| | | |
|---|---|---|
| *G02B 9/60* | (2006.01) | |
| *G02B 7/02* | (2021.01) | |
| *H04N 5/225* | (2006.01) | |
| *G02B 13/00* | (2006.01) | |
| *G02B 5/00* | (2006.01) | |
| *G02B 13/18* | (2006.01) | |
| *G02B 13/04* | (2006.01) | |

(52) U.S. Cl.
CPC .............. *G02B 9/60* (2013.01); *G02B 7/021* (2013.01); *H04N 5/2254* (2013.01); *G02B 5/005* (2013.01); *G02B 13/0045* (2013.01); *G02B 13/04* (2013.01); *G02B 13/18* (2013.01)

(58) Field of Classification Search
CPC ...... G02B 13/0045; G02B 9/60; G02B 13/18; G02B 5/005; G02B 13/04; G02B 7/021; H04N 5/2254
USPC ................................. 359/714, 715, 740, 763
See application file for complete search history.

(56) References Cited

U.S. PATENT DOCUMENTS

| | | | | |
|---|---|---|---|---|
| 9,402,012 | B2 * | 7/2016 | Nagano .............. | G02B 13/0045 |
| 10,606,035 | B2 * | 3/2020 | Chen ........................ | G02B 9/64 |
| 2006/0103947 | A1 * | 5/2006 | Shinohara ............ | H04N 5/2254 |
| | | | | 359/687 |

(Continued)

FOREIGN PATENT DOCUMENTS

| | | |
|---|---|---|
| CN | 105137573 | 12/2015 |
| TW | 201219882 | 5/2012 |

(Continued)

*Primary Examiner* — Evelyn A Lester
(74) *Attorney, Agent, or Firm* — JCIPRNET

(57) ABSTRACT

An optical imaging lens including a first lens element, a second lens element, a third lens element, an aperture, a fourth lens element and a fifth lens element is provided. The first lens element is arranged to be a lens element of which refracting power being equal to 0 inverse millimeter ($mm^{-1}$) in a first order from the object-side to the image-side. The second lens element is arranged to be a lens element having refracting power in a first order from the first lens element to the image-side. The third lens element is arranged to be a lens element having refracting power in a second order from the first lens element to the image-side. The fourth and fifth lens element are respectively arranged to be lens elements having refracting power in a first and a second order from the aperture to the image-side.

20 Claims, 34 Drawing Sheets

(56) References Cited

U.S. PATENT DOCUMENTS

| | | | | |
|---|---|---|---|---|
| 2013/0242362 A1* | 9/2013 | Nakayama | ............... | H04N 1/00 358/509 |
| 2014/0029117 A1* | 1/2014 | Noda | ................. | G02B 13/0045 359/714 |
| 2014/0071332 A1* | 3/2014 | Kanetaka | ........... | G02B 13/0045 359/708 |
| 2014/0347710 A1* | 11/2014 | Nagano | .............. | H04N 1/02815 358/483 |
| 2016/0178878 A1* | 6/2016 | Liu | ........................ | G02B 17/08 359/364 |
| 2017/0052350 A1* | 2/2017 | Chen | ................... | G02B 13/0045 |
| 2018/0188493 A1* | 7/2018 | Huang | ............... | G02B 13/0045 |
| 2019/0187419 A1* | 6/2019 | Sato | ........................ | G02B 1/041 |

FOREIGN PATENT DOCUMENTS

| | | |
|---|---|---|
| TW | 201317660 | 5/2013 |
| TW | 201329500 | 7/2013 |
| TW | I622798 | 5/2018 |
| TW | 201823797 | 7/2018 |
| TW | 201837525 | 10/2018 |
| TW | I637212 | 10/2018 |
| TW | 201839441 | 11/2018 |
| TW | I642991 | 12/2018 |

\* cited by examiner

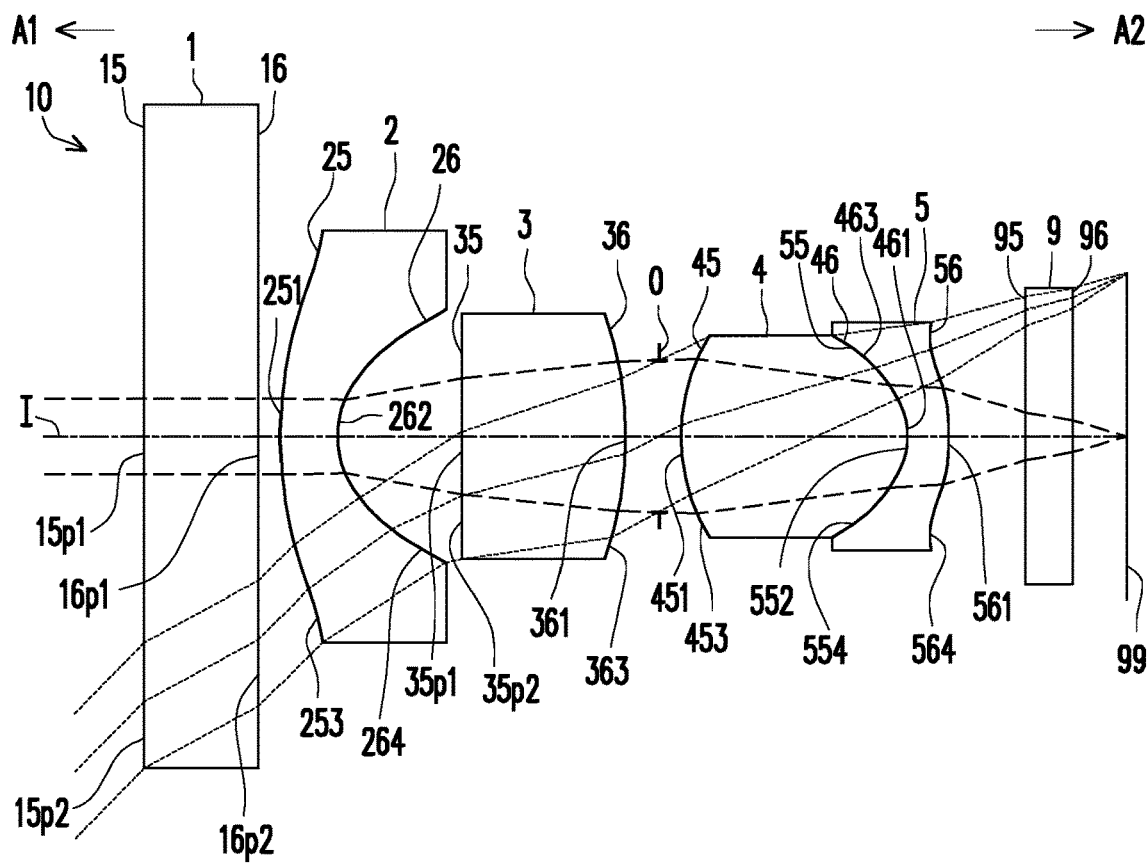
FIG. 6
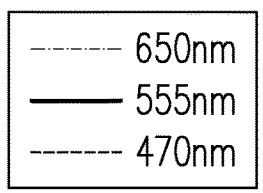
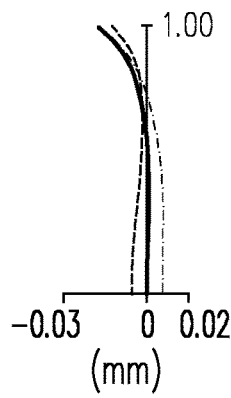
FIG. 7A
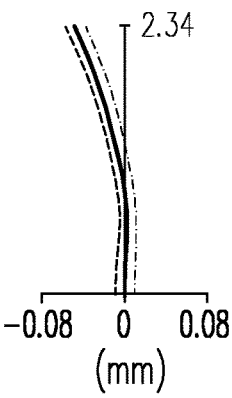
FIG. 7B
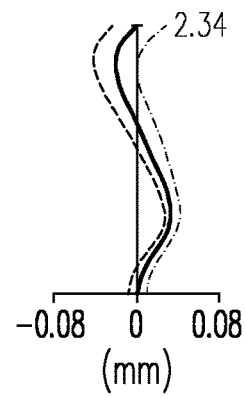
FIG. 7C
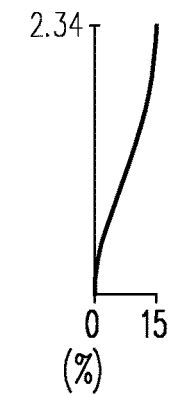
FIG. 7D

| First Embodiment | | | | | | | |
|---|---|---|---|---|---|---|---|
| Effective focal length=1.635 mm, Half field of view =50.648°, System length= 14.713 mm, F-number=1.830, Image height =2.340 mm. | | | | | | | |
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 6.255 |
| | Image-side Surface 16 | Infinity | 0.300 | | | | 5.249 |
| Second lens element 2 | Object-side Surface 25 | 4.987 | 0.592 | 1.533 | 55.811 | -3.360 | 3.587 |
| | Image-side Surface 26 | 1.264 | 3.471 | | | | 2.152 |
| Third lens element 3 | Object-side Surface 35 | Infinity | 1.331 | 1.727 | 38.021 | 7.704 | 1.921 |
| | Image-side Surface 36 | -5.600 | 0.959 | | | | 1.779 |
| Aperture 0 | | Infinity | 0.392 | | | | 1.018 |
| Fourth lens element 4 | Object-side Surface 45 | 2.819 | 3.077 | 1.533 | 55.811 | 15.021 | 1.425 |
| Fifth lens element 5 | Object-side Surface 55 | -0.889 | 0.484 | 1.647 | 22.418 | 6.036 | 1.457 |
| | Image-side Surface 56 | -2.286 | 0.908 | | | | 1.642 |
| Filter 9 | Object-side Surface 95 | Infinity | 0.700 | 1.518 | 64.166 | Infinity | 1.989 |
| | Image-side Surface 96 | Infinity | 0.800 | | | | 2.119 |
| | Image plane 99 | | 0.003 | | | | 2.352 |

FIG. 8

| Surface | K | $a_4$ | $a_6$ | $a_8$ | $a_{10}$ |
|---|---|---|---|---|---|
| 25 | 0.000000E+00 | 1.736701E-02 | -5.805637E-03 | 9.714130E-04 | -1.150947E-04 |
| 26 | -6.944165E-01 | 3.390262E-02 | 3.519426E-03 | -8.665984E-03 | 4.527611E-03 |
| 45 | -2.457474E-02 | 3.121153E-03 | 1.079022E-03 | -1.518781E-03 | 1.136327E-03 |
| 55 | -8.902898E-01 | -8.296657E-02 | 1.663586E-01 | -1.027451E-01 | 5.122635E-02 |
| 56 | 3.336409E-02 | 1.362903E-02 | -2.670683E-03 | 2.747484E-04 | -8.167652E-17 |
| Surface | $a_{12}$ | $a_{14}$ | $a_{16}$ | | |
| 25 | 8.849543E-06 | | | | |
| 26 | -1.452146E-03 | | | | |
| 45 | -2.224087E-04 | | | | |
| 55 | -1.896559E-02 | | | | |
| 56 | | | | | |

FIG. 9

| Second Embodiment ||||||||
|---|---|---|---|---|---|---|---|
| Effective focal length=1.667 mm, Half field of view =57.089°, System length= 14.997 mm, F-number=1.830, Image height =2.340 mm. ||||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 2.040 | 1.518 | 64.166 | Infinity | 8.377 |
| | Image-side Surface 16 | Infinity | 0.360 | | | | 7.023 |
| Second lens element 2 | Object-side Surface 25 | 5.496 | 1.090 | 1.533 | 55.811 | -3.426 | 4.287 |
| | Image-side Surface 26 | 1.277 | 4.187 | | | | 2.087 |
| Third lens element 3 | Object-side Surface 35 | Infinity | 1.262 | 1.727 | 38.021 | 10.196 | 1.749 |
| | Image-side Surface 36 | -7.411 | 0.800 | | | | 1.591 |
| Aperture 0 | | Infinity | -0.419 | | | | 1.137 |
| Fourth lens element 4 | Object-side Surface 45 | 2.301 | 2.727 | 1.533 | 55.811 | 9.880 | 1.179 |
| Fifth lens element 5 | Object-side Surface 55 | -1.029 | 0.300 | 1.647 | 22.418 | 12.291 | 1.202 |
| | Image-side Surface 56 | -3.438 | 1.151 | | | | 1.366 |
| Filter 9 | Object-side Surface 95 | Infinity | 0.700 | 1.518 | 64.166 | Infinity | 1.852 |
| | Image-side Surface 96 | Infinity | 0.800 | | | | 2.021 |
| | Image plane 99 | Infinity | 0.003 | | | | 2.341 |

FIG. 12

| Surface | K | $a_4$ | $a_6$ | $a_8$ | $a_{10}$ |
|---|---|---|---|---|---|
| 25 | 0.000000E+00 | 9.930961E-03 | -2.364083E-03 | 2.709057E-04 | -2.225181E-05 |
| 26 | -7.584262E-01 | 4.039349E-02 | 2.934858E-03 | -2.522577E-03 | 9.184048E-04 |
| 45 | -6.169571E-03 | 1.099729E-03 | 1.006918E-03 | 5.852357E-05 | 1.544326E-04 |
| 55 | -8.950245E-01 | -3.793534E-02 | 5.208108E-02 | -2.038572E-02 | 2.113314E-04 |
| 56 | 0.000000E+00 | 3.045117E-02 | 1.097142E-02 | -2.455919E-03 | 5.477269E-04 |
| Surface | $a_{12}$ | $a_{14}$ | $a_{16}$ | | |
| 25 | 1.194843E-06 | -3.609153E-08 | 4.565372E-10 | | |
| 26 | -1.954414E-04 | 2.174399E-05 | -1.002895E-06 | | |
| 45 | -2.993354E-05 | | | | |
| 55 | -2.552541E-03 | 2.562504E-04 | | | |
| 56 | -2.695117E-17 | | | | |

FIG. 13

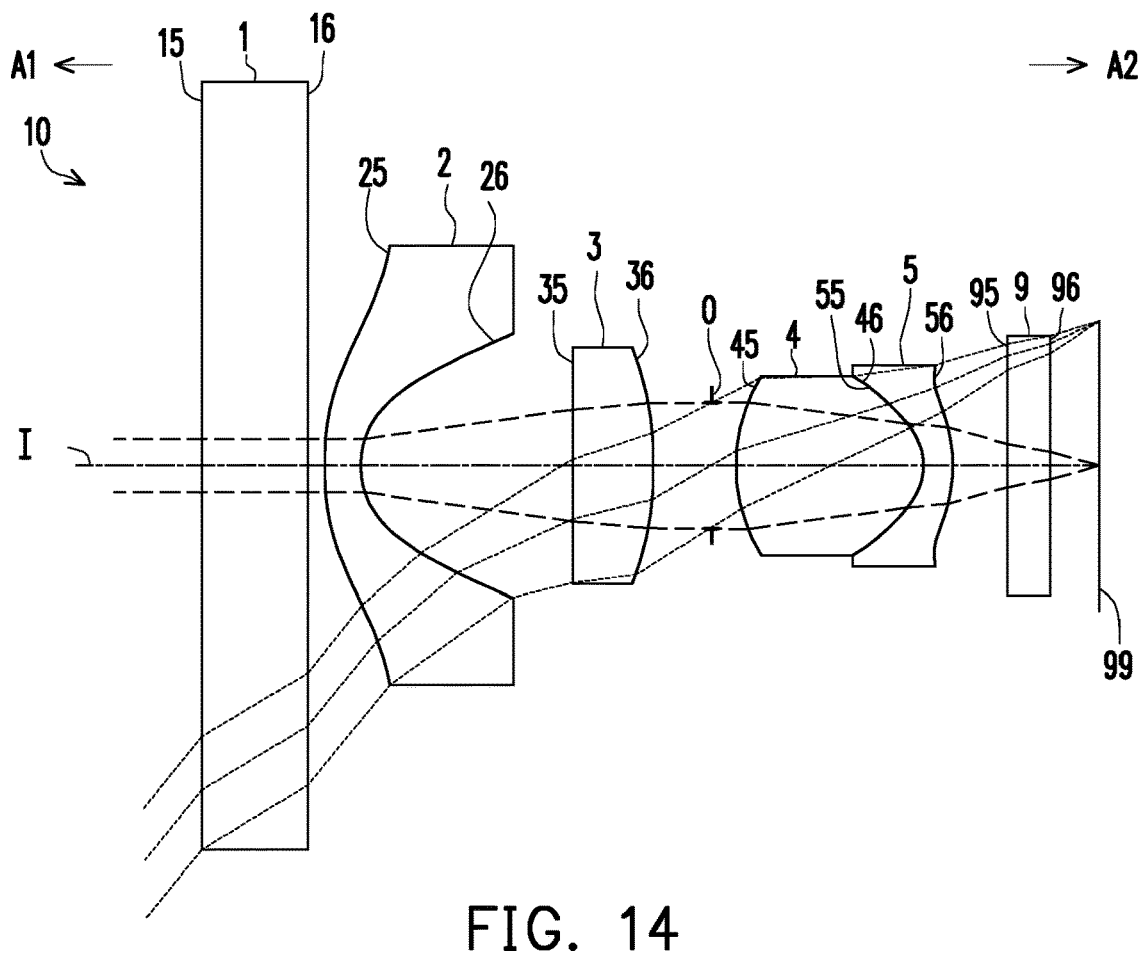
FIG. 14
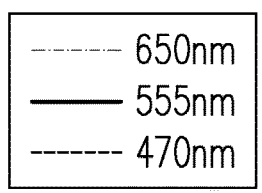
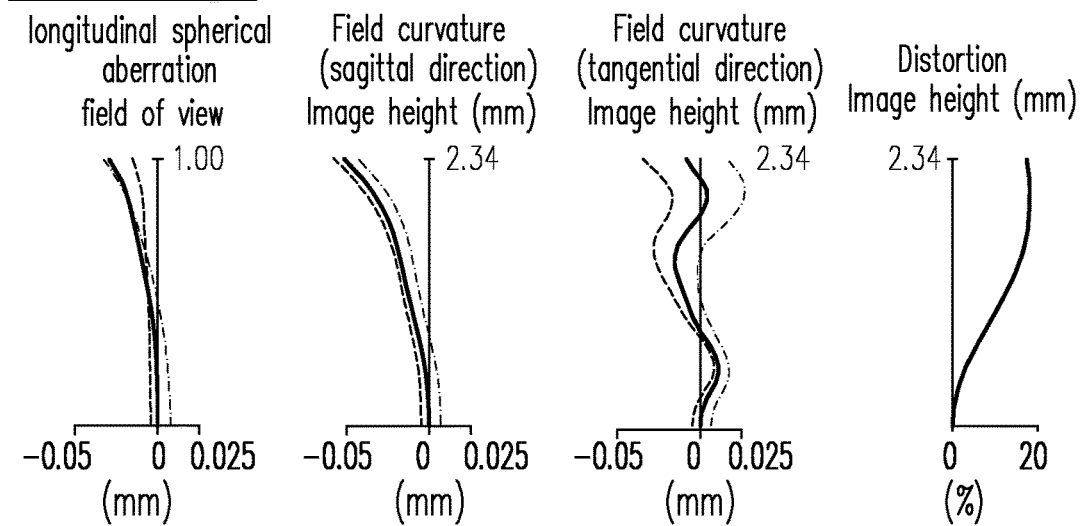
FIG. 15A   FIG. 15B   FIG. 15C   FIG. 15D

| Third Embodiment |||||||
|---|---|---|---|---|---|---|
| Effective focal length=2.015 mm, Half field of view =45.313°, System length= 14.473 mm, F-number=1.830, Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 4.822 |
| | Image-side Surface 16 | Infinity | 0.300 | | | | 3.921 |
| Second lens element 2 | Object-side Surface 25 | 7.377 | 0.854 | 1.533 | 55.811 | -3.345 | 2.985 |
| | Image-side Surface 26 | 1.379 | 1.836 | | | | 1.842 |
| Third lens element 3 | Object-side Surface 35 | Infinity | 2.395 | 1.727 | 38.021 | 7.566 | 1.782 |
| | Image-side Surface 36 | -5.500 | 0.500 | | | | 1.475 |
| Aperture 0 | | Infinity | 0.321 | | | | 1.102 |
| Fourth lens element 4 | Object-side Surface 45 | 2.841 | 3.332 | 1.533 | 55.811 | 13.381 | 1.452 |
| Fifth lens element 5 | Object-side Surface 55 | -1.044 | 0.609 | 1.647 | 22.418 | 6.158 | 1.464 |
| | Image-side Surface 56 | -2.480 | 1.127 | | | | 1.652 |
| Filter 9 | Object-side Surface 95 | Infinity | 0.700 | 1.518 | 64.166 | Infinity | 2.027 |
| | Image-side Surface 96 | Infinity | 0.800 | | | | 2.148 |
| | Image plane 99 | Infinity | 0.003 | | | | 2.364 |

FIG. 16

| Surface | K | $a_4$ | $a_6$ | $a_8$ | $a_{10}$ |
|---|---|---|---|---|---|
| 25 | 0.000000E+00 | 1.775521E-02 | -5.774343E-03 | 9.737066E-04 | -1.148914E-04 |
| 26 | -6.995708E-01 | 4.073270E-02 | -5.853418E-04 | -8.587527E-03 | 4.681967E-03 |
| 45 | -1.147291E-03 | 3.301792E-03 | 1.107392E-03 | -1.436619E-03 | 1.054659E-03 |
| 55 | -8.880466E-01 | -6.328945E-02 | 1.418281E-01 | -1.108320E-01 | 5.511945E-02 |
| 56 | 0.000000E+00 | 3.353309E-02 | 9.387670E-03 | -2.319505E-03 | 3.124790E-04 |
| Surface | $a_{12}$ | $a_{14}$ | $a_{16}$ | | |
| 25 | 8.859833E-06 | -3.875373E-07 | 7.055032E-09 | | |
| 26 | -1.452146E-03 | 2.326460E-04 | -1.545163E-05 | | |
| 45 | -2.224087E-04 | | | | |
| 55 | -1.896559E-02 | 2.741705E-03 | | | |
| 56 | -7.621529E-17 | | | | |

FIG. 17

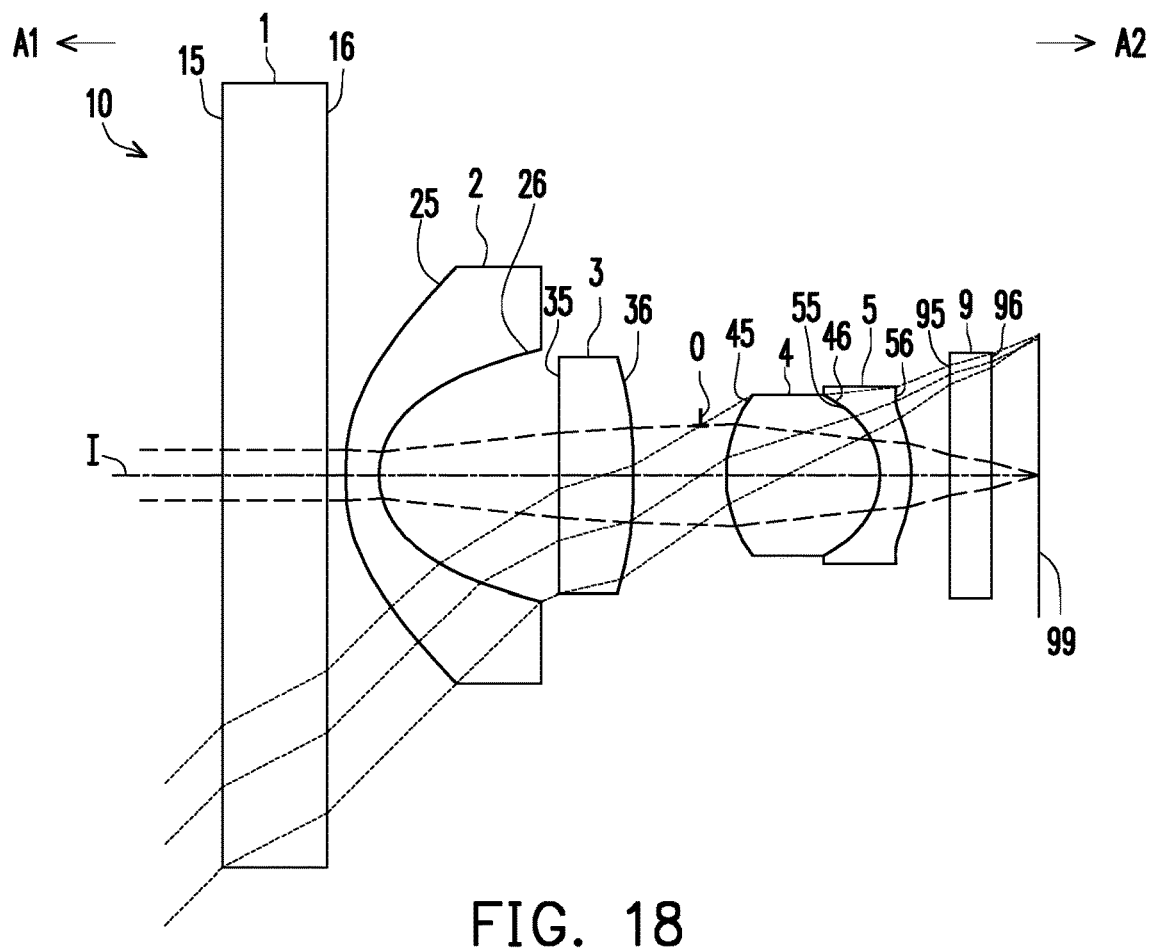
FIG. 18
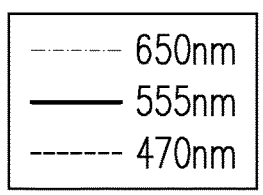
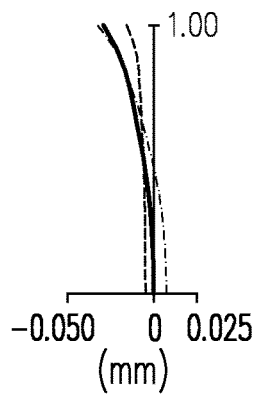
FIG. 19A
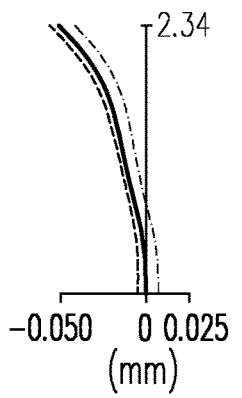
FIG. 19B
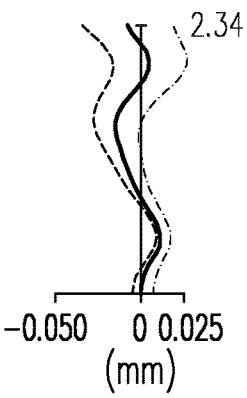
FIG. 19C
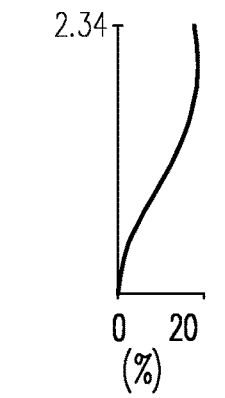
FIG. 19D

| Fourth Embodiment | | | | | | | |
|---|---|---|---|---|---|---|---|
| Effective focal length=1.540 mm, Half field of view =45.014°, System length= 13.855 mm, F-number=1.830, Image height =2.340 mm. | | | | | | | |
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.768 | 1.518 | 64.166 | Infinity | 6.695 |
| | Image-side Surface 16 | Infinity | 0.312 | | | | 5.765 |
| Second lens element 2 | Object-side Surface 25 | 4.415 | 0.573 | 1.533 | 55.811 | -4.033 | 3.554 |
| | Image-side Surface 26 | 1.381 | 3.064 | | | | 2.140 |
| Third lens element 3 | Object-side Surface 35 | Infinity | 1.256 | 1.727 | 38.021 | 10.880 | 2.017 |
| | Image-side Surface 36 | -7.908 | 1.136 | | | | 1.784 |
| Aperture 0 | | Infinity | 0.440 | | | | 0.842 |
| Fourth lens element 4 | Object-side Surface 45 | 2.394 | 2.605 | 1.533 | 55.811 | 9.267 | 1.374 |
| Fifth lens element 5 | Object-side Surface 55 | -1.573 | 0.536 | 1.647 | 22.418 | 4.427 | 1.369 |
| | Image-side Surface 56 | -2.221 | 0.665 | | | | 1.502 |
| Filter 9 | Object-side Surface 95 | Infinity | 0.700 | 1.518 | 64.166 | Infinity | 1.881 |
| | Image-side Surface 96 | Infinity | 0.800 | | | | 2.062 |
| | Image plane 99 | Infinity | 0.003 | | | | 2.392 |

FIG. 20

| Surface | K | $a_4$ | $a_6$ | $a_8$ | $a_{10}$ |
|---|---|---|---|---|---|
| 25 | 0.000000E+00 | 1.847011E-02 | -4.720073E-03 | 7.366468E-04 | -8.109281E-05 |
| 26 | -6.673498E-01 | 2.754247E-02 | 3.189643E-03 | -6.223761E-03 | 3.366507E-03 |
| 45 | 9.813800E-02 | 3.523456E-03 | 1.102178E-03 | -1.239960E-03 | 7.439920E-04 |
| 55 | 6.481435E-02 | -1.508588E-01 | 1.260621E-01 | -7.613587E-02 | 4.079974E-02 |
| 56 | 0.000000E+00 | 3.373532E-02 | 1.073239E-02 | -3.421493E-04 | 7.581604E-04 |
| Surface | $a_{12}$ | $a_{14}$ | $a_{16}$ | | |
| 25 | 5.732966E-06 | -2.329693E-07 | 4.100234E-09 | | |
| 26 | -9.432861E-04 | 1.397211E-04 | -8.579742E-06 | | |
| 45 | -1.444725E-04 | | | | |
| 55 | -1.231969E-02 | 1.646597E-03 | | | |
| 56 | -2.066710E-15 | | | | |

FIG. 21

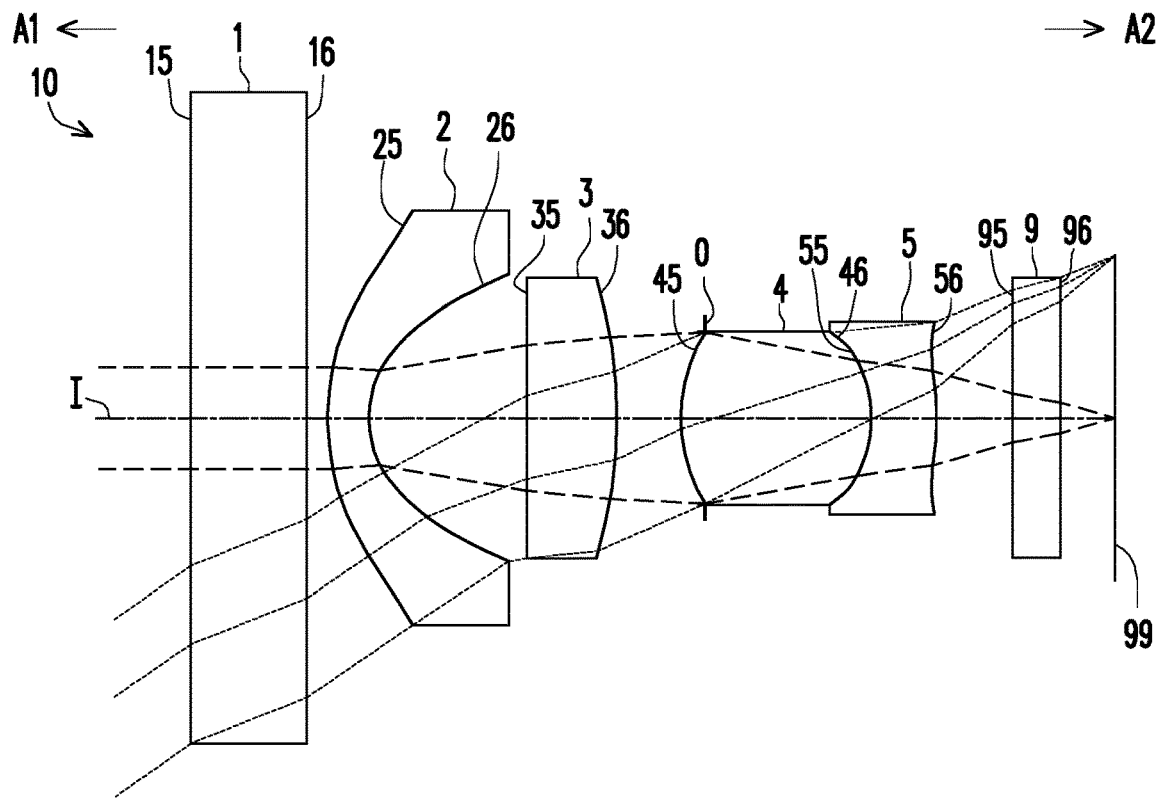
FIG. 22
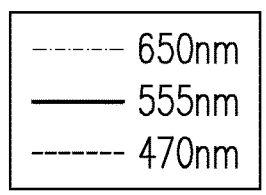
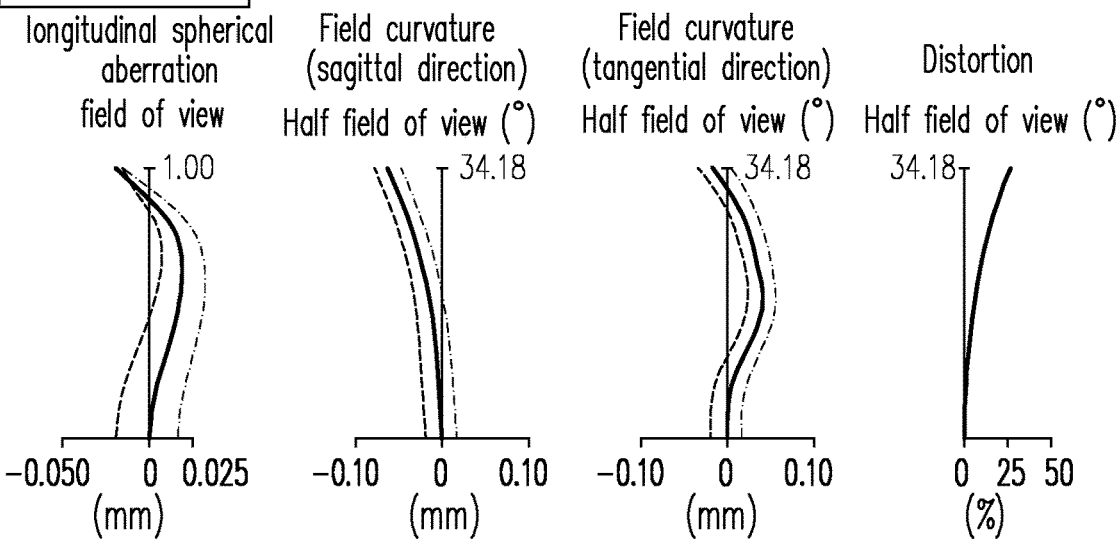
FIG. 23A   FIG. 23B   FIG. 23C   FIG. 23D

| Fifth Embodiment |||||||
|---|---|---|---|---|---|---|
| Effective focal length=2.712 mm, Half field of view =34.179°, System length= 14.473 mm, F-number=1.830, Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 4.742 |
| | Image-side Surface 16 | Infinity | 0.300 | | | | 4.065 |
| Second lens element 2 | Object-side Surface 25 | 7.377 | 0.854 | 1.533 | 55.811 | -3.345 | 3.005 |
| | Image-side Surface 26 | 1.379 | 1.836 | | | | 2.082 |
| Third lens element 3 | Object-side Surface 35 | Infinity | 2.395 | 1.727 | 38.021 | 7.566 | 2.035 |
| | Image-side Surface 36 | -5.500 | 0.500 | | | | 1.930 |
| Aperture 0 | | Infinity | 0.321 | | | | 1.251 |
| Fourth lens element 4 | Object-side Surface 45 | 2.841 | 3.332 | 1.533 | 55.811 | 13.381 | 1.257 |
| Fifth lens element 5 | Object-side Surface 55 | -1.044 | 0.609 | 1.647 | 22.418 | 6.158 | 1.245 |
| | Image-side Surface 56 | -2.480 | 1.127 | | | | 1.396 |
| Filter 9 | Object-side Surface 95 | Infinity | 0.700 | 1.518 | 64.166 | Infinity | 1.854 |
| | Image-side Surface 96 | Infinity | 0.800 | | | | 2.031 |
| | Image plane 99 | Infinity | 0.003 | | | | 2.352 |

FIG. 24

| Surface | K | $a_4$ | $a_6$ | $a_8$ | $a_{10}$ |
|---|---|---|---|---|---|
| 25 | 0.000000E+00 | 1.806038E-02 | -5.898403E-03 | 9.641635E-04 | -1.147536E-04 |
| 26 | -6.546450E-01 | 3.641245E-02 | 8.947577E-04 | -8.139490E-03 | 4.727177E-03 |
| 45 | -1.399592E-02 | 2.144113E-03 | 2.102205E-03 | -1.645777E-03 | 1.075935E-03 |
| 55 | -8.390884E-01 | -5.097455E-02 | 9.349817E-02 | -1.087325E-01 | 5.126172E-02 |
| 56 | 0.000000E+00 | 3.608229E-02 | 9.605881E-03 | -2.803134E-03 | 6.024407E-04 |
| Surface | $a_{12}$ | $a_{14}$ | $a_{16}$ | | |
| 25 | 8.945200E-06 | -3.822645E-07 | 5.879584E-09 | | |
| 26 | -1.452146E-03 | 2.326460E-04 | -1.545163E-05 | | |
| 45 | -2.224087E-04 | | | | |
| 55 | -1.896559E-02 | 2.741705E-03 | | | |
| 56 | -9.306999E-17 | | | | |

FIG. 25

| Sixth Embodiment |||||||
|---|---|---|---|---|---|---|
| Effective focal length=1.644 mm, Half field of view =50.011°, System length= 14.627 mm, F-number=1.830, Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | 200.000 | 1.500 | 1.518 | 64.166 | 150730.107 | 6.186 |
| | Image-side Surface 16 | 200.000 | 0.330 | | | | 5.293 |
| Second lens element 2 | Object-side Surface 25 | 5.874 | 0.550 | 1.533 | 55.811 | -3.397 | 3.658 |
| | Image-side Surface 26 | 1.340 | 3.727 | | | | 2.128 |
| Third lens element 3 | Object-side Surface 35 | Infinity | 1.448 | 1.727 | 38.021 | 9.242 | 1.807 |
| | Image-side Surface 36 | -6.717 | 0.800 | | | | 1.619 |
| Aperture 0 | | Infinity | 0.302 | | | | 1.076 |
| Fourth lens element 4 | Object-side Surface 45 | 2.610 | 3.073 | 1.533 | 55.811 | 12.721 | 1.465 |
| Fifth lens element 5 | Object-side Surface 55 | -0.899 | 0.328 | 1.647 | 22.418 | 7.652 | 1.428 |
| | Image-side Surface 56 | -2.578 | 1.070 | | | | 1.556 |
| Filter 9 | Object-side Surface 95 | Infinity | 0.700 | 1.518 | 64.166 | Infinity | 1.882 |
| | Image-side Surface 96 | Infinity | 0.800 | | | | 1.997 |
| | Image plane 99 | Infinity | 0.003 | | | | 2.199 |

FIG. 28

| Surface | K | $a_4$ | $a_6$ | $a_8$ | $a_{10}$ |
|---|---|---|---|---|---|
| 25 | 0.000000E+00 | 1.317889E-02 | -3.583736E-03 | 4.997051E-04 | -4.878817E-05 |
| 26 | -7.019937E-01 | 2.679012E-02 | 4.665123E-03 | -4.375623E-03 | 1.856337E-03 |
| 45 | -3.297384E-02 | 2.455113E-03 | 3.148769E-04 | -4.301400E-04 | 4.705630E-04 |
| 55 | -9.280078E-01 | -4.333642E-02 | 1.019039E-01 | -4.919612E-02 | 1.732391E-02 |
| 56 | 0.000000E+00 | 3.340069E-02 | 1.056370E-02 | -1.726198E-03 | 1.631933E-04 |
| Surface | $a_{12}$ | $a_{14}$ | $a_{16}$ | | |
| 25 | 3.099509E-06 | -1.123144E-07 | 1.743001E-09 | | |
| 26 | -5.089682E-04 | 6.738925E-05 | -3.698997E-06 | | |
| 45 | -7.795290E-05 | 0.000000E+00 | 0.000000E+00 | | |
| 55 | -6.647324E-03 | 7.941743E-04 | 0.000000E+00 | | |
| 56 | -2.681113E-17 | 0.000000E+00 | 0.000000E+00 | | |

FIG. 29

| Seventh Embodiment |||||||
|---|---|---|---|---|---|---|
| Effective focal length=1.568 mm, Half field of view =48.705°, System length= 14.108 mm, F-number=1.830, Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 5.767 |
| | Image-side Surface 16 | Infinity | 0.300 | | | | 4.799 |
| Second lens element 2 | Object-side Surface 25 | 4.580 | 0.704 | 1.533 | 55.811 | -3.271 | 3.289 |
| | Image-side Surface 26 | 1.196 | 2.857 | | | | 1.976 |
| Third lens element 3 | Object-side Surface 35 | Infinity | 1.573 | 1.727 | 38.021 | 6.730 | 1.829 |
| | Image-side Surface 36 | -4.891 | 0.853 | | | | 1.656 |
| Aperture 0 | | Infinity | 0.471 | | | | 0.914 |
| Fourth lens element 4 | Object-side Surface 45 | 2.963 | 2.000 | 1.533 | 55.811 | 14.123 | 1.321 |
| Fifth lens element 5 | Object-side Surface 55 | -1.376 | 0.500 | 1.647 | 22.418 | -34.993 | 1.374 |
| | Image-side Surface 56 | -12.235 | 0.409 | | | | 1.502 |
| Sixth lens element 6 | Object-side Surface 65 | 4.099 | 0.733 | 1.533 | 55.811 | 4.249 | 1.792 |
| | Image-side Surface 66 | -4.753 | 0.508 | | | | 1.709 |
| Filter 9 | Object-side Surface 95 | Infinity | 0.700 | 1.518 | 64.166 | Infinity | 1.821 |
| | Image-side Surface 96 | Infinity | 0.800 | | | | 2.002 |
| | Image plane 99 | Infinity | 0.003 | | | | 2.340 |

FIG. 32

| Surface | K | $a_4$ | $a_6$ | $a_8$ | $a_{10}$ |
|---|---|---|---|---|---|
| 25 | 0.000000E+00 | 1.702023E-02 | -5.886231E-03 | 9.686948E-04 | -1.147802E-04 |
| 26 | -7.262786E-01 | 4.172271E-02 | 3.078981E-03 | -8.975315E-03 | 4.507497E-03 |
| 45 | 2.446494E-01 | 5.198396E-03 | 2.871616E-04 | -5.612980E-04 | 7.667807E-04 |
| 55 | -8.840534E-01 | -5.953797E-02 | 9.681830E-02 | -8.936357E-02 | 5.526219E-02 |
| 56 | 0.000000E+00 | -1.049702E-03 | 1.254471E-03 | 6.132427E-04 | 3.427914E-04 |
| 65 | 0.000000E+00 | 2.008178E-03 | 1.954816E-03 | 3.994860E-04 | 7.025574E-05 |
| 66 | 0.000000E+00 | 4.772108E-02 | 4.687542E-03 | -4.327987E-04 | 2.862524E-04 |
| Surface | $a_{12}$ | $a_{14}$ | $a_{16}$ | | |
| 25 | 8.869924E-06 | -3.878500E-07 | 7.148447E-09 | | |
| 26 | -1.452146E-03 | 2.326460E-04 | -1.545163E-05 | | |
| 45 | -2.224087E-04 | | | | |
| 55 | -1.896559E-02 | 2.741705E-03 | | | |
| 56 | 1.629166E-19 | 3.169859E-21 | | | |
| 65 | 1.465664E-19 | 3.167172E-21 | | | |
| 66 | -7.632615E-17 | | | | |

FIG. 33

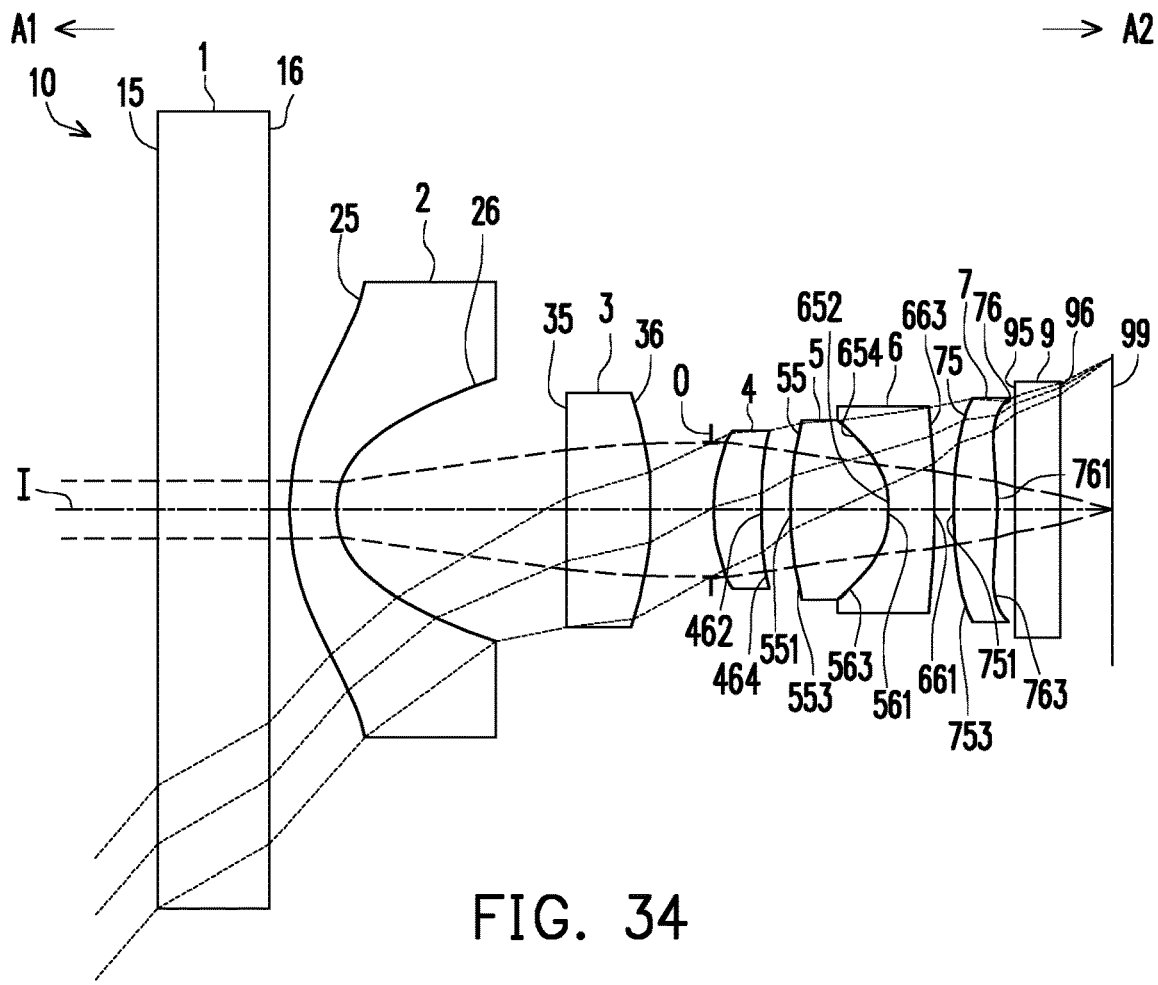
FIG. 34
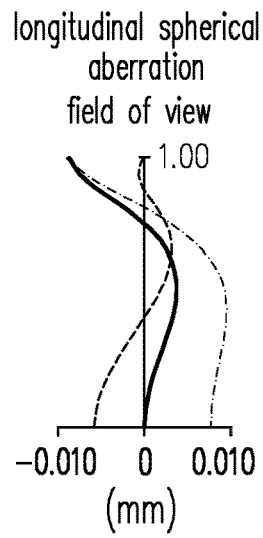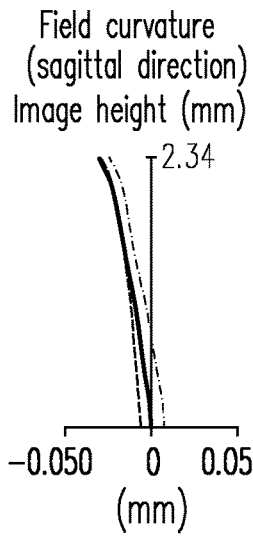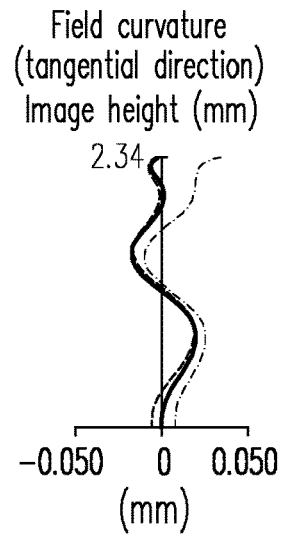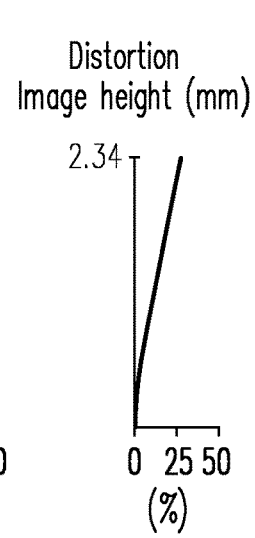
FIG. 35A  FIG. 35B  FIG. 35C  FIG. 35D

| Eighth Embodiment | | | | | | | |
|---|---|---|---|---|---|---|---|
| Effective focal length=1.626 mm, Half field of view =48.236°, System length= 14.633 mm, F-number=1.830, Image height =2.340 mm. | | | | | | | |
| Element | Surface | Radius (mm) | Distance (mm) | Refractive index | Dispersion coefficient | Focal length (mm) | Effective radius (mm) |
| Object | | | | | | | |
| First lens element 1 | Object-side Surface 15 | Infinity | 1.700 | 1.518 | 64.166 | Infinity | 6.043 |
| | Image-side Surface 16 | Infinity | 0.300 | | | | 5.084 |
| Second lens element 2 | Object-side Surface 25 | 4.486 | 0.717 | 1.533 | 55.811 | -3.295 | 3.456 |
| | Image-side Surface 26 | 1.193 | 3.524 | | | | 2.005 |
| Third lens element 3 | Object-side Surface 35 | Infinity | 1.302 | 1.727 | 38.021 | 7.492 | 1.778 |
| | Image-side Surface 36 | -5.446 | 0.918 | | | | 1.653 |
| Aperture 0 | | Infinity | 0.051 | | | | 1.025 |
| Fourth lens element 4 | Object-side Surface 45 | 3.006 | 0.735 | 1.533 | 55.811 | 8.116 | 1.173 |
| | Image-side Surface 46 | 9.000 | 0.438 | | | | 1.203 |
| Fifth lens element 5 | Object-side Surface 55 | 4.897 | 1.505 | 1.533 | 55.811 | 42.929 | 1.330 |
| Sixth lens element 6 | Object-side Surface 65 | -1.443 | 0.700 | 1.647 | 22.418 | -40.368 | 1.372 |
| | Image-side Surface 66 | -12.343 | 0.300 | | | | 1.564 |
| Seventh lens element 7 | Object-side Surface 75 | 7.440 | 0.658 | 1.533 | 55.811 | 5.969 | 1.705 |
| | Image-side Surface 76 | -5.394 | 0.281 | | | | 1.663 |
| Filter 9 | Object-side Surface 95 | Infinity | 0.700 | 1.518 | 64.166 | Infinity | 1.731 |
| | Image-side Surface 96 | Infinity | 0.800 | | | | 1.943 |
| | Image plane 99 | Infinity | 0.003 | | | | 2.346 |

FIG. 36

| Surface | K | $a_4$ | $a_6$ | $a_8$ | $a_{10}$ |
|---|---|---|---|---|---|
| 25 | 0.000000E+00 | 1.717919E-02 | -5.873858E-03 | 9.692508E-04 | -1.147951E-04 |
| 26 | -7.199242E-01 | 4.387707E-02 | 4.151580E-03 | -8.920284E-03 | 4.494423E-03 |
| 45 | 4.424007E-01 | 4.887749E-03 | 3.906977E-03 | 8.529485E-05 | 8.843651E-04 |
| 46 | 0.000000E+00 | 1.810831E-03 | 4.400157E-03 | 8.361064E-04 | 1.059427E-03 |
| 55 | 0.000000E+00 | -3.407968E-03 | -1.204322E-03 | 2.105493E-04 | 2.655906E-05 |
| 65 | -6.233366E-01 | -1.034145E-01 | 1.080231E-01 | -8.396767E-02 | 5.324343E-02 |
| 66 | 0.000000E+00 | -1.220560E-03 | 2.548143E-04 | 1.054335E-04 | 1.356156E-04 |
| 75 | 0.000000E+00 | 4.234089E-03 | 8.479848E-04 | 2.729044E-04 | 9.775985E-05 |
| 76 | 0.000000E+00 | 3.266972E-02 | 5.628722E-03 | 2.646821E-04 | 1.256805E-04 |
| Surface | $a_{12}$ | $a_{14}$ | $a_{16}$ | | |
| 25 | 8.859416E-06 | -3.875589E-07 | 7.199269E-09 | | |
| 26 | -1.452146E-03 | 2.326460E-04 | -1.545163E-05 | | |
| 45 | -2.224087E-04 | | | | |
| 46 | 6.888707E-20 | | | | |
| 55 | 6.851720E-20 | | | | |
| 65 | -1.896559E-02 | 2.741705E-03 | | | |
| 66 | 7.371496E-20 | | | | |
| 75 | 7.165607E-20 | | | | |
| 76 | -7.505749E-17 | | | | |

FIG. 37

| Ninth Embodiment |||||||
|---|---|---|---|---|---|---|
| Effective focal length=2.046 mm, Half field of view =44.641°, System length= 14.951 mm, F-number=2.600 Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 5.734 |
| | Image-side Surface 16 | Infinity | 0.300 | | | | 4.846 |
| Second lens element 2 | Object-side Surface 25 | 5.249 | 0.576 | 1.533 | 55.811 | -4.045 | 3.359 |
| | Image-side Surface 26 | 1.471 | 4.109 | | | | 2.062 |
| Third lens element 3 | Object-side Surface 35 | 43.788 | 1.775 | 1.747 | 44.850 | 8.632 | 1.572 |
| | Image-side Surface 36 | -7.430 | 0.800 | | | | 1.307 |
| Aperture 0 | | Infinity | -0.159 | | | | 0.875 |
| Fourth lens element 4 | Object-side Surface 45 | 2.312 | 2.561 | 1.533 | 55.811 | 9.209 | 0.883 |
| Fifth lens element 5 | Object-side Surface 55 | -1.352 | 0.642 | 1.647 | 22.418 | -157.877 | 1.059 |
| | Image-side Surface 56 | -8.576 | 1.146 | | | | 1.234 |
| Filter 9 | Object-side Surface 95 | Infinity | 0.700 | 1.518 | 64.166 | Infinity | 1.761 |
| | Image-side Surface 96 | Infinity | 0.800 | | | | 1.965 |
| | Image plane 99 | Infinity | 0.003 | | | | 2.350 |

FIG. 40

| Surface | K | $a_4$ | $a_6$ | $a_8$ | $a_{10}$ |
|---|---|---|---|---|---|
| 25 | 0.000000E+00 | 1.845688E-02 | -5.723684E-03 | 9.757629E-04 | -1.151406E-04 |
| 26 | -6.133589E-01 | 3.337909E-02 | 3.212609E-03 | -8.273385E-03 | 4.721009E-03 |
| 45 | -5.292849E-02 | 2.407554E-03 | 2.729321E-03 | -1.622722E-03 | 9.482882E-04 |
| 55 | -1.368570E+00 | -4.308090E-02 | 6.438741E-02 | -9.692322E-02 | 4.634754E-02 |
| 56 | 0.000000E+00 | 4.001435E-02 | 8.279617E-03 | -2.772398E-03 | 5.513054E-04 |
| Surface | $a_{12}$ | $a_{14}$ | $a_{16}$ | | |
| 25 | 8.828812E-06 | -3.890311E-07 | 7.400205E-09 | | |
| 26 | -1.452146E-03 | 2.326460E-04 | -1.545163E-05 | | |
| 45 | -2.224087E-04 | | | | |
| 55 | -1.896559E-02 | 2.741705E-03 | | | |
| 56 | -7.224109E-17 | | | | |

FIG. 41

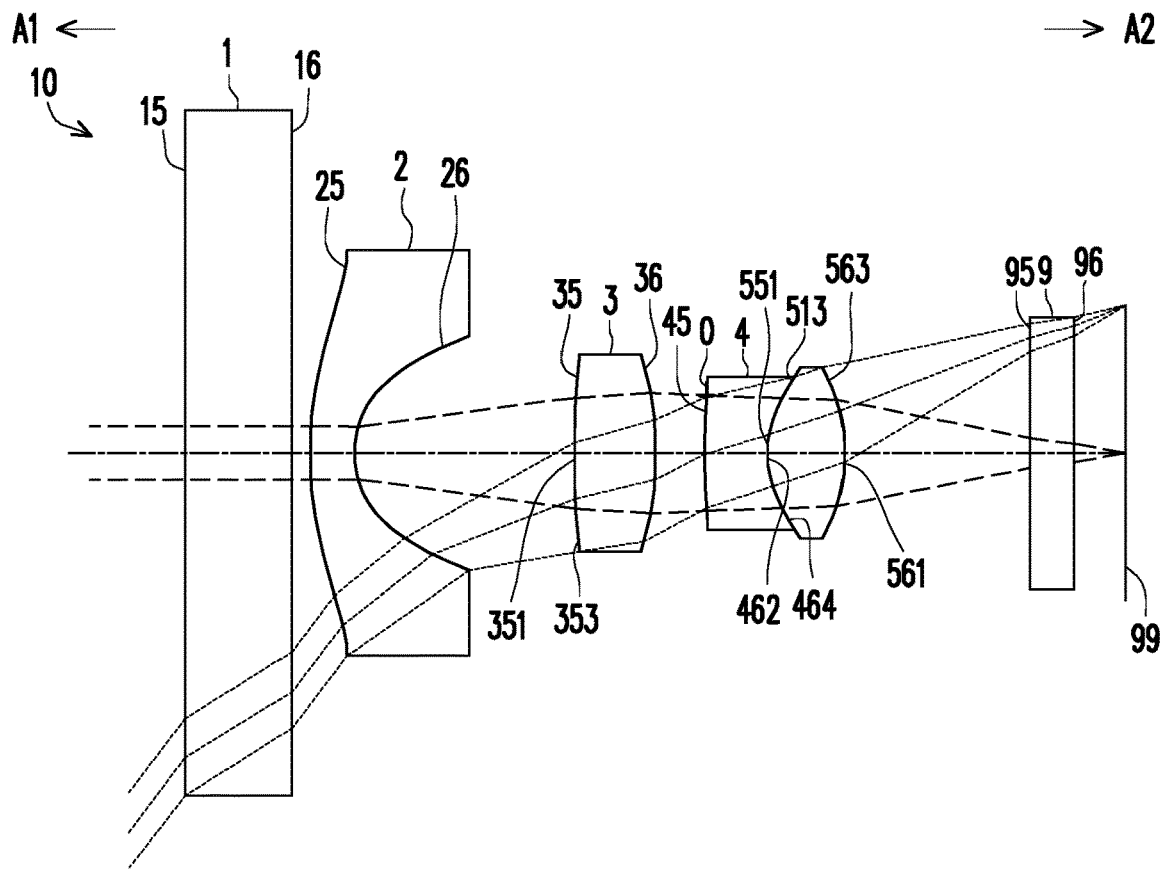
FIG. 42
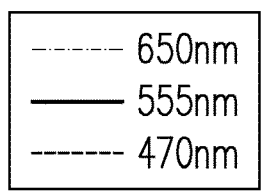
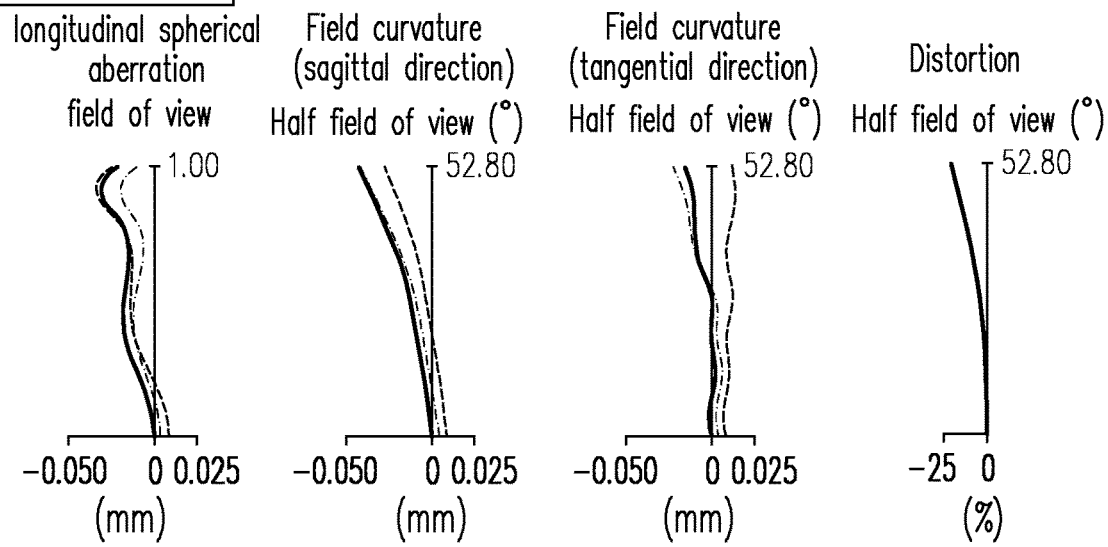
FIG. 43A  FIG. 43B  FIG. 43C  FIG. 43D

| Tenth Embodiment |||||||
|---|---|---|---|---|---|---|
| Effective focal length=2.255 mm, Half field of view =52.800°, System length= 14.997 mm, F-number=2.600, Image height =2.340 mm. |||||||
| Element | Surface | Radius (mm) | Distance (mm) | Refractive index | Dispersion coefficient | Focal length (mm) | Effective radius (mm) |
| Object | | | Infinity | | | | |
| First lens element 1 | Object-side Surface 15 | Infinity | 1.700 | 1.518 | 64.166 | Infinity | 5.449 |
| | Image-side Surface 16 | Infinity | 0.300 | | | | 4.401 |
| Second lens element 2 | Object-side Surface 25 | 8.930 | 0.695 | 1.533 | 55.811 | -3.377 | 3.225 |
| | Image-side Surface 26 | 1.458 | 3.511 | | | | 1.863 |
| Third lens element 3 | Object-side Surface 35 | 15.736 | 1.308 | 1.760 | 27.671 | 5.546 | 1.556 |
| | Image-side Surface 36 | -5.550 | 0.800 | | | | 1.406 |
| Aperture 0 | | | Infinity | -0.021 | | | 0.925 |
| Fourth lens element 4 | Object-side Surface 45 | 10.666 | 1.006 | 1.647 | 22.418 | -138.460 | 0.924 |
| Fifth lens element 5 | Object-side Surface 55 | 1.529 | 1.229 | 1.533 | 55.811 | 7.650 | 1.219 |
| | Image-side Surface 56 | -2.754 | 2.970 | | | | 1.363 |
| Filter 9 | Object-side Surface 95 | Infinity | 0.700 | 1.518 | 64.166 | Infinity | 2.069 |
| | Image-side Surface 96 | Infinity | 0.800 | | | | 2.166 |
| | Image plane 99 | Infinity | 0.003 | | | | 2.343 |

FIG. 44

| Surface | K | $a_4$ | $a_6$ | $a_8$ | $a_{10}$ |
|---|---|---|---|---|---|
| 25 | 0.000000E+00 | 1.773947E-02 | -5.711108E-03 | 9.768109E-04 | -1.148935E-04 |
| 26 | -7.693800E-01 | 4.548969E-02 | 5.764038E-03 | -8.035391E-03 | 4.653233E-03 |
| 45 | -8.810275E+01 | 2.318497E-03 | -1.569423E-02 | 1.896116E-02 | -8.343703E-03 |
| 55 | -1.412037E+00 | -2.325621E-02 | 2.946470E-02 | -4.908768E-02 | 4.601079E-02 |
| 56 | 0.000000E+00 | 6.717892E-03 | -3.307154E-04 | 2.592878E-04 | -2.393501E-04 |
| Surface | $a_{12}$ | $a_{14}$ | $a_{16}$ | | |
| 25 | 8.823543E-06 | -3.915037E-07 | 7.558458E-09 | | |
| 26 | -1.452146E-03 | 2.326460E-04 | -1.545163E-05 | | |
| 45 | -2.224087E-04 | | | | |
| 55 | -1.896559E-02 | 2.741705E-03 | | | |
| 56 | 6.536603E-17 | | | | |

FIG. 45

| Condition | First Embodiment | Second Embodiment | Third Embodiment | Fourth Embodiment | Fifth Embodiment | Sixth Embodiment |
|---|---|---|---|---|---|---|
| EFL | 1.635 | 1.667 | 2.015 | 1.540 | 2.712 | 1.644 |
| Fno | 1.830 | 1.830 | 1.830 | 1.830 | 1.830 | 1.830 |
| HFOV | 50.648 | 57.089 | 45.313 | 45.014 | 34.179 | 50.011 |
| SR | 1.018 | 1.137 | 1.102 | 0.842 | 1.251 | 1.076 |
| ImgH | 2.340 | 2.340 | 2.340 | 2.340 | 2.340 | 2.340 |
| T1 | 1.700 | 2.040 | 1.700 | 1.768 | 1.700 | 1.500 |
| G12 | 0.300 | 0.360 | 0.300 | 0.312 | 0.300 | 0.330 |
| T2 | 0.592 | 1.090 | 0.854 | 0.573 | 0.854 | 0.550 |
| G23 | 3.471 | 4.187 | 1.836 | 3.064 | 1.836 | 3.727 |
| T3 | 1.331 | 1.262 | 2.395 | 1.256 | 2.395 | 1.448 |
| G34 | 1.352 | 0.381 | 0.821 | 1.576 | 0.821 | 1.102 |
| T4 | 3.077 | 2.727 | 3.332 | 2.605 | 3.332 | 3.073 |
| G45 | 0.000 | 0.000 | 0.000 | 0.000 | 0.000 | 0.000 |
| T5 | 0.484 | 0.300 | 0.609 | 0.536 | 0.609 | 0.328 |
| G5F | 0.908 | 1.151 | 1.127 | 0.665 | 1.127 | 1.070 |
| G56 | | | | | | |
| T6 | | | | | | |
| G6F | | | | | | |
| G67 | | | | | | |
| T7 | | | | | | |
| G7F | | | | | | |
| TF | 0.700 | 0.700 | 0.700 | 0.700 | 0.700 | 0.700 |
| GFP | 0.800 | 0.800 | 0.800 | 0.800 | 0.800 | 0.800 |
| L2A1R | 3.587 | 4.287 | 2.985 | 3.554 | 3.005 | 3.658 |
| BFL | 2.408 | 2.651 | 2.627 | 2.165 | 2.627 | 2.570 |
| TL | 12.306 | 12.347 | 11.846 | 11.690 | 11.846 | 12.058 |
| TTL | 14.713 | 14.997 | 14.473 | 13.855 | 14.473 | 14.627 |
| ALT | 7.183 | 7.419 | 8.889 | 6.738 | 8.889 | 6.899 |
| AAG | 5.123 | 4.928 | 2.957 | 4.952 | 2.957 | 5.159 |
| L2A1R/ImgH | 1.533 | 1.832 | 1.275 | 1.519 | 1.284 | 1.563 |
| V2/n2 | 36.406 | 36.406 | 36.406 | 36.406 | 36.406 | 36.406 |
| V3/n3 | 22.016 | 22.016 | 22.016 | 22.016 | 22.016 | 22.016 |
| V4/n4 | 36.406 | 36.406 | 36.406 | 36.406 | 36.406 | 36.406 |
| V5/n5 | 13.612 | 13.612 | 13.612 | 13.612 | 13.612 | 13.612 |
| ImgH/SR | 2.298 | 2.058 | 2.124 | 2.779 | 1.871 | 2.174 |
| TTL/EFL | 8.999 | 8.997 | 7.182 | 8.999 | 5.337 | 8.898 |
| (EFL+T5)/G23 | 0.610 | 0.470 | 1.429 | 0.677 | 1.809 | 0.529 |
| (EFL+T1)/T4 | 1.084 | 1.359 | 1.115 | 1.270 | 1.324 | 1.023 |
| (EFL+G34)/(T2+G12) | 3.350 | 1.412 | 2.458 | 3.520 | 3.062 | 3.120 |
| (EFL+T2)/(T1+T5) | 1.020 | 1.178 | 1.243 | 0.917 | 1.545 | 1.200 |
| (T1+T5+G12+G45)/T3 | 1.866 | 2.140 | 1.089 | 2.083 | 1.089 | 1.490 |
| (T1+T2+G12+G45)/G34 | 1.917 | 9.172 | 3.474 | 1.684 | 3.474 | 2.160 |
| (EFL+ALT)/AAG | 1.721 | 1.844 | 3.687 | 1.672 | 3.923 | 1.656 |
| TL/BFL | 5.111 | 4.658 | 4.510 | 5.398 | 4.510 | 4.692 |

FIG. 46

| Condition | Seventh Embodiment | Eighth Embodiment | Ninth Embodiment | Tenth Embodiment |
|---|---|---|---|---|
| EFL | 1.568 | 1.626 | 2.046 | 2.255 |
| Fno | 1.830 | 1.830 | 2.600 | 2.600 |
| HFOV | 48.705 | 48.236 | 44.641 | 52.800 |
| SR | 0.914 | 1.025 | 0.875 | 0.925 |
| ImgH | 2.340 | 2.340 | 2.340 | 2.340 |
| T1 | 1.700 | 1.700 | 1.700 | 1.700 |
| G12 | 0.300 | 0.300 | 0.300 | 0.300 |
| T2 | 0.704 | 0.717 | 0.576 | 0.695 |
| G23 | 2.857 | 3.524 | 4.109 | 3.511 |
| T3 | 1.573 | 1.302 | 1.775 | 1.308 |
| G34 | 1.324 | 0.969 | 0.641 | 0.779 |
| T4 | 2.000 | 0.735 | 2.561 | 1.006 |
| G45 | 0.000 | 0.438 | 0.000 | 0.000 |
| T5 | 0.500 | 1.505 | 0.642 | 1.229 |
| G5F | 1.650 | 1.939 | 1.146 | 2.970 |
| G56 | 0.409 | 0.000 | | |
| T6 | 0.733 | 0.700 | | |
| G6F | 0.508 | 1.239 | | |
| G67 | | 0.300 | | |
| T7 | | 0.658 | | |
| G7F | | 0.281 | | |
| TF | 0.700 | 0.700 | 0.700 | 0.700 |
| GFP | 0.800 | 0.800 | 0.800 | 0.800 |
| L2A1R | 3.289 | 3.456 | 3.359 | 3.225 |
| BFL | 3.150 | 3.439 | 2.646 | 4.470 |
| TL | 10.958 | 11.191 | 12.305 | 10.527 |
| TTL | 14.108 | 14.630 | 14.951 | 14.997 |
| ALT | 6.477 | 5.959 | 7.254 | 5.938 |
| AAG | 4.481 | 5.231 | 5.050 | 4.590 |
| L2A1R/ImgH | 1.406 | 1.477 | 1.477 | 1.477 |
| V2/n2 | 36.406 | 36.406 | 36.406 | 36.406 |
| V3/n3 | 22.016 | 22.016 | 22.016 | 22.016 |
| V4/n4 | 36.406 | 36.406 | 36.406 | 13.612 |
| V5/n5 | 13.612 | 36.406 | 13.612 | 36.406 |
| ImgH/SR | 2.559 | 2.283 | 2.673 | 2.530 |
| TTL/EFL | 8.997 | 8.997 | 7.309 | 6.651 |
| (EFL+T5)/G23 | 0.724 | 0.889 | 0.654 | 0.992 |
| (EFL+T1)/T4 | 1.634 | 4.525 | 1.462 | 3.930 |
| (EFL+G34)/(T2+G12) | 2.880 | 2.553 | 3.066 | 3.050 |
| (EFL+T2)/(T1+T5) | 1.033 | 0.731 | 1.119 | 1.007 |
| (T1+T5+G12+G45)/T3 | 1.590 | 3.028 | 1.489 | 2.469 |
| (T1+T2+G12+G45)/G34 | 2.042 | 3.255 | 4.019 | 3.460 |
| (EFL+ALT)/AAG | 1.795 | 1.450 | 1.841 | 1.785 |
| TL/BFL | 3.479 | 3.254 | 4.650 | 2.355 |

FIG. 47

OPTICAL IMAGING LENS

CROSS-REFERENCE TO RELATED APPLICATION

This application claims the priority benefit of China application serial no. 201811624477.1, filed on Dec. 28, 2018. The entirety of the above-mentioned patent application is hereby incorporated by reference herein and made a part of this specification.

BACKGROUND

Technical Field

The invention relates to an optical device, and particularly relates to an optical imaging lens.

Description of Related Art

As portable electronic products with novel specifications emerge one after another, the development of a crucial component, namely the optical imaging lens, is also diversified. The applications of vehicle lenses continue to expand—for example, car-backing systems, 360-degree panoramic systems, lane departure warning systems, and advanced driver assistance systems (ADAS). One vehicle may thus be equipped with 6 to 20 lenses. Moreover, lens specifications are constantly refined, and VGA (300,000) is upgraded to megapixels. However, compared with the imaging quality of lenses providing tens of millions of pixels for mobile phones, the imaging quality of vehicle lenses still requires refinement.

Vehicle lenses normally operate at ambient temperature between −20° C. and 80° C. and are required to withstand rigorous environmental tests such as wind, rain, and sun; hence, a first lens element of a lens is made of glass which can pass environmental test. The half field of view a vehicle lens must be large enough to meet requirements for rear view, car-backing, and 360-degree panoramic, and so on; as a result, a glass lens element of large negative refracting power is necessary. The process difficulty and cost of grinding glass are however increased. Therefore, how to withstand environmental tests of vehicle lenses under the premise of ensuring thermal stability, wide half-field of view, low cost, and imaging quality has become an issue to work on in many respects.

SUMMARY

One or some exemplary embodiments of the invention provide an optical imaging lens ensuring desirable thermal stability, having desirable optical parameters and rendering a desirable imaging quality.

An embodiment of the invention provides an optical imaging lens including a first lens element, a second lens element, a third lens element, an aperture, a fourth lens element and a fifth lens element arranged in sequence from an object side to an image side along an optical axis, wherein each of the first lens element through the fifth lens element has an object-side surface facing toward the object side and allowing imaging rays to pass through as well as an image-side surface facing toward the image side and allowing the imaging rays to pass through. The first lens element is arranged to be a lens element of which refracting power being equal to 0 inverse millimeter ($mm^{-1}$) in a first order from the object side to the image side. The second lens element is arranged to be a lens element having refracting power in a first order from the first lens element to the image side. The third lens element is arranged to be a lens element having refracting power in a second order from the first lens element to the image side. The third lens element has positive refracting power. The fourth lens element is arranged to be a lens element having refracting power in a first order from the aperture to the image-side. At least one of the object-side surface of the fourth lens element and the image-side surface of the fourth lens element is aspherical surface. The fifth lens element is arranged to be a lens element having refracting power in a second order from the aperture to the image side. Both the object-side surface of the fifth lens element and the image-side surface of the fifth lens element are aspherical surfaces.

An embodiment of the invention provides an optical imaging lens including a first lens element, a second lens element, a third lens element, an aperture, a fourth lens element and a fifth lens element arranged in sequence from an object side to an image side along an optical axis, wherein each of the first lens element through the fifth lens element has an object-side surface facing toward the object side and allowing imaging rays to pass through as well as an image-side surface facing toward the image side and allowing the imaging rays to pass through. The first lens element is arranged to be a lens element of which refracting power being equal to 0 inverse millimeter ($mm^{-1}$) in a first order from the object side to the image side. The second lens element is arranged to be a lens element having refracting power in a first order from the first lens element to the image side. The third lens element is arranged to be a lens element having refracting power in a second order from the first lens element to the image side. The fourth lens element is arranged to be a lens element having refracting power in a first order from the aperture to the image side. At least one of the object-side surface of the fourth lens element and the image-side surface of the fourth lens element is aspherical surface. The fifth lens element is arranged to be a lens element having refracting power in a second order from the aperture to the image side. Both the object-side surface of the fifth lens element and the image-side surface of the fifth lens element are aspherical surfaces. The optical imaging lens satisfies a condition as follows: $1.250 \leq L2A1R/ImgH \leq 2.200$, wherein L2A1R is an effective radius of the object-side surface of the second lens element, and ImgH is an image height of the optical imaging lens.

In view of the foregoing, in the optical imaging lens of the embodiments of the invention, by satisfying the arrangement among the first to fifth lens elements and the aperture, that the refracting power of the first lens element equals 0 inverse millimeter, that at least one of the object-side surface and the image-side surface of the fourth lens element is aspherical surface, and that both the object-side surface and the image-side surface of the fifth lens element are aspherical surfaces, the optical imaging lens according to the embodiments of the invention ensures desirable thermal stability, desirable optical parameters, and desirable imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 12 shows detailed optical data of the optical imaging lens according to the second embodiment of the invention.

FIG. 13 shows aspheric parameters pertaining to the optical imaging lens according to the second embodiment of the invention.

FIG. 14 is a schematic diagram illustrating an optical imaging lens according to a third embodiment of the invention.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the invention.

FIG. 17 shows aspheric parameters pertaining to the optical imaging lens according to the third embodiment of the invention.

FIG. 18 is a schematic diagram illustrating an optical imaging lens according to a fourth embodiment of the invention.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 22 is a schematic diagram illustrating an optical imaging lens according to a fifth embodiment of the invention.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 32 shows detailed optical data of the optical imaging lens according to the seventh embodiment of the invention.

FIG. 33 shows aspheric parameters pertaining to the optical imaging lens according to the seventh embodiment of the invention.

FIG. 34 is a schematic diagram illustrating an optical imaging lens according to an eighth embodiment of the invention.

FIGS. 35A to 35D are diagrams illustrating a longitudinal spherical aberration and various aberrations of the optical imaging lens according to the eighth embodiment.

FIG. 36 shows detailed optical data of the optical imaging lens according to the eighth embodiment of the invention.

FIG. 37 shows aspheric parameters pertaining to the optical imaging lens according to the eighth embodiment of the invention.

FIG. 40 shows detailed optical data of the optical imaging lens according to the ninth embodiment of the invention.

FIG. 41 shows aspheric parameters pertaining to the optical imaging lens according to the ninth embodiment of the invention.

FIG. 42 is a schematic diagram illustrating an optical imaging lens according to a tenth embodiment of the invention.

FIGS. 43A to 43D are diagrams illustrating a longitudinal spherical aberration and various aberrations of the optical imaging lens according to the tenth embodiment.

FIG. 44 shows detailed optical data of the optical imaging lens according to the tenth embodiment of the invention.

FIG. 45 shows aspheric parameters pertaining to the optical imaging lens according to the tenth embodiment of the invention.

FIG. 46 shows values of respective important parameters and relations thereof of the optical imaging lenses according to the first through sixth embodiments of the invention.

FIG. 47 shows values of respective important parameters and relations thereof of the optical imaging lenses according to the seventh through tenth embodiments of the invention.

DESCRIPTION OF THE EMBODIMENTS

Figure 1:
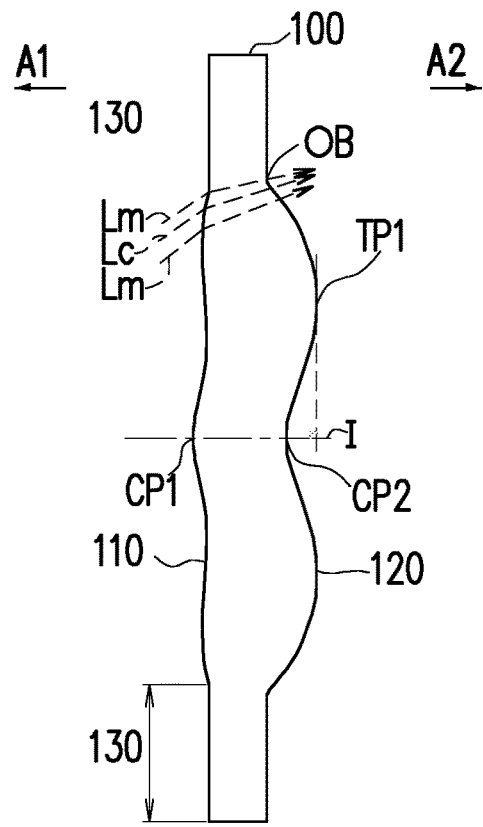
FIG. 1 is a schematic diagram illustrating a surface shape structure of a lens.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
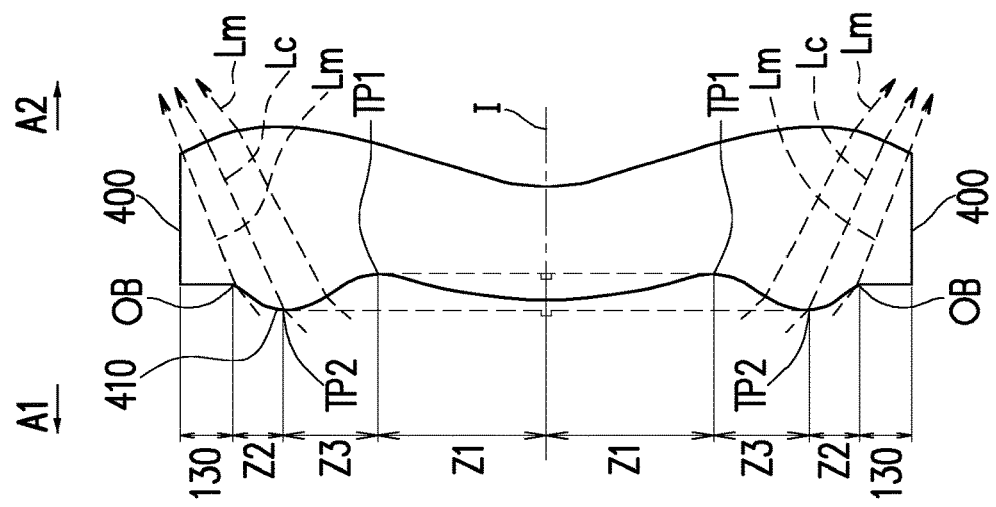
FIG. 4 is a schematic diagram illustrating a surface shape structure of a lens according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
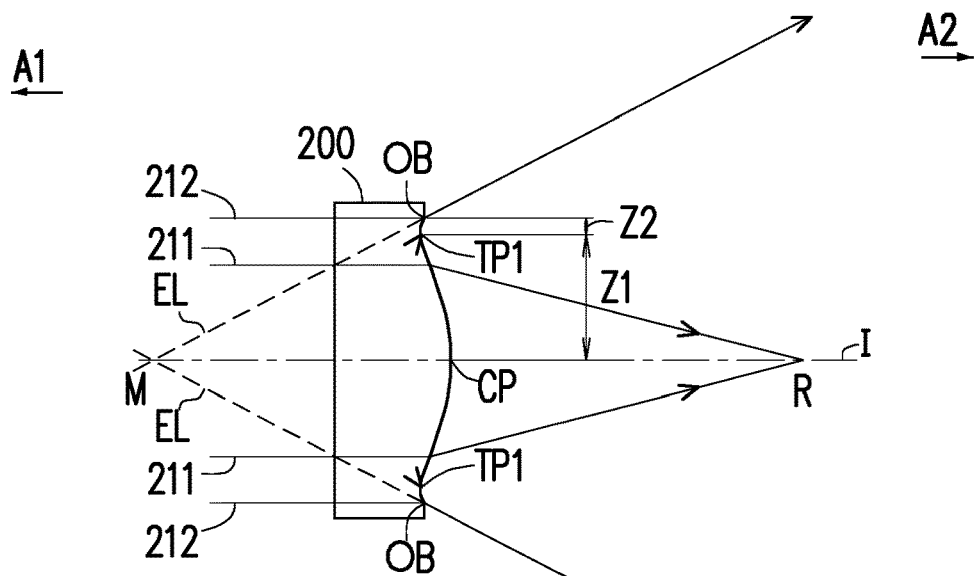
FIG. 2 is a schematic diagram illustrating surface shape concave and convex structures and a light focal point of a lens.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
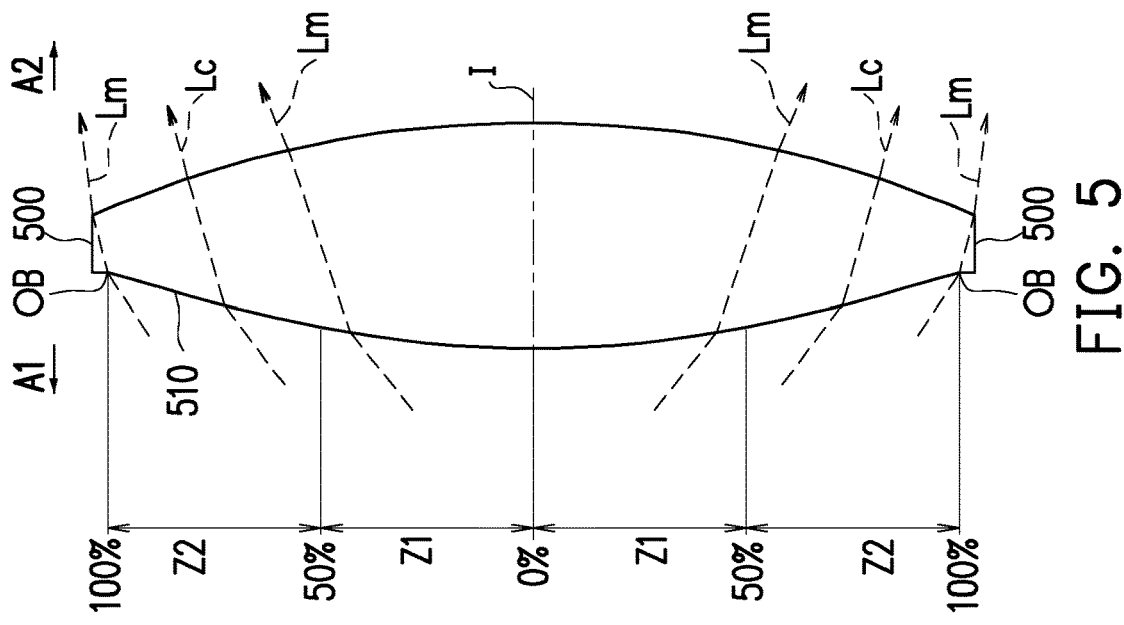
FIG. 5 is a schematic diagram illustrating a surface shape structure of a lens according to Example 3.
Figure 3:
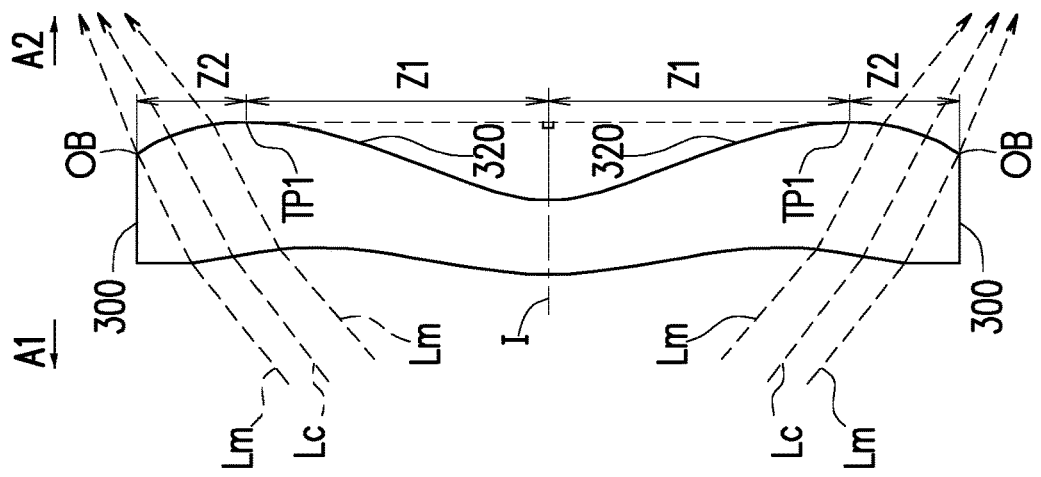
FIG. 3 is a schematic diagram illustrating a surface shape structure of a lens according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention. FIGS. 7A to 7D illustrate longitudinal spherical aberration and various aberrations of the optical imaging lens according to the first embodiment. Referring to FIG. 6, an optical imaging lens 10 of the first embodiment of the invention includes a first lens element 1, a second lens element 2, a third lens element 3, an aperture 0, a fourth lens element 4, a fifth lens element 5, and a filter 9 arranged in sequence from an object side A1 to an image side A2 along an optical axis I of the optical imaging lens 10. When rays emitted from an object to be shot enter the optical imaging lens 10 and pass in sequence through the first lens element 1, the second lens element 2, the third lens element 3, the aperture 0, the fourth lens element 4, the fifth lens element 5, and the filter 9, an image may be formed on an image plane 99. The filter 9, which is disposed between the fifth lens element 5 and the image plane 99, is for example an infrared (IR) cut-off filter. It should be noted that the object side A1 is a side facing the object to be shot, and the image side A2 is a side facing the image plane 99.

In the present embodiment, the first lens element 1, the second lens element 2, the third lens element 3, the fourth lens element 4, the fifth lens element 5, and the filter 9 of the optical imaging lens 10 respectively have object-side surfaces 15, 25, 35, 45, 55, and 95 facing the object side A1 and allowing imaging rays to pass therethrough, and respectively have image-side surfaces 16, 26, 36, 46, 56, and 96 facing the image side A2 and allowing the imaging rays to pass therethrough.

The first lens element 1 is arranged to be a lens element of which refracting power being equal to 0 inverse millimeter ($mm^{-1}$) in a first order from the object side to the image-side. The first lens element 1 is made of glass. Both the object-side surface 15 and the image-side surface 16 of the first lens element 1 are planar surfaces (namely flat). The optical axis region 15p1 of the object-side surface 15 of the first lens element 1 is a planar surface. The periphery region 15p2 of the object-side surface 15 of the first lens element 1 is a planar surface. The optical axis region 16p1 of the image-side surface 16 of the first lens element 1 is a planar surface. The periphery region 16p2 of the image-side surface 16 of the first lens element 1 is a planar surface.

The second lens element 2 is arranged to be a lens element having refracting power in a first order from the first lens element 1 to the image side A2. The second lens element 2 is made of plastic and has negative refracting power. The optical axis region 251 of the object-side surface 25 of the second lens element 2 is convex, and its periphery region 253 is convex. The optical axis region 262 of the image-side surface 26 of the second lens element 2 is concave, and its periphery region 264 is concave. In this embodiment, both the object-side surface 25 and the image-side surface 26 of the second lens element 2 are aspherical surfaces.

The third lens element 3 is arranged to be a lens element having refracting power in a second order from the first lens element 1 to the image side A2. The third lens element 3 is made of glass and has positive refracting power. The object-side surface 35 of the third lens element 3 is a planar surface. The optical axis region 35p1 of the object-side surface 35 of the third lens element 3 is a planar surface. The periphery region 35p2 of the object-side surface 35 of the third lens element 3 is a planar surface. The optical axis region 361 of the image-side surface 36 of the third lens element 3 is convex, and its periphery region 363 is convex. In the present embodiment, the image-side surface 36 of the third lens element 3 is a spherical surface.

The aperture 0 is disposed between the third lens element 3 and the fourth lens element 4.

The fourth lens element 4 is arranged to be a lens element having refracting power in a first order from the aperture 0 to the image side A2. The fourth lens element 4 is made of plastic and has positive refracting power. The optical axis region 451 of the object-side surface 45 of the fourth lens element 4 is convex, and its periphery region 453 is convex. The optical axis region 461 of the image-side surface 46 of the fourth lens element 4 is convex, and its periphery region 463 is convex. In the present embodiment, both the object-side surface 45 and the image-side surface 46 of the fourth lens element 4 are aspherical surfaces.

The fifth lens element 5 is arranged to be a lens element having refracting power in a second order from the aperture 0 to the image side A2. The fifth lens element 5 is made of plastic and has positive refracting power. The optical axis region 552 of the object-side surface 55 of the fifth lens element 5 is concave, and its periphery region 554 is concave. The optical axis region 561 of the image-side surface 56 of the fifth lens element 5 is convex, and its periphery region 564 is concave. In the present embodiment, both the object-side surface 55 and the image-side surface 56 of the fifth lens element 5 are aspherical surfaces.

The gap between the fourth lens element 4 and the fifth lens element 5 may be filled with glue (or a colloid), a film or a cemented material (sometimes also referred to as cohesive material) to form a cemented lens element.

In the optical design of the optical imaging lens 10 of the first embodiment, high thermal stability is achieved. For example, the room temperature of 20° C. is set as a standard under which a focal shift of the optical imaging lens 10 is 0.0000 mm. The focal shift of the optical imaging lens 10 is −0.0228 mm at a temperature of −20° C. When the temperature rises to 80° C., the focal shift of the optical imaging lens 10 is 0.0423 mm. The present invention is however not limited to this.

The other detailed optical data of the first embodiment are as shown in FIG. 8. Moreover, in the optical imaging lens 10 of the first embodiment, an effective focal length (EFL) of the whole system is 1.635 millimeters (mm), a half field of view (HFOV) is 50.648°, a system length is 14.713 mm, an F-number (Fno) is 1.830, and an image height is 2.340 mm. The system length refers to a distance from the object-side surface 15 of the first lens element 1 to the image plane 99 along the optical axis I.

In addition, in the present embodiment, a total of six surfaces (namely the object-side surfaces 25, 45, and 55 and the image-side surfaces 26, 46, and 56 mentioned above) are even aspheric surfaces. These aspheric surfaces are defined by the following equation:

$$Z(Y) = \frac{Y^2}{R} / \left(1 + \sqrt{1-(1+K)\frac{Y^2}{R^2}}\right) + \sum_{i=1}^{n} a_i \times Y^i \quad (1)$$

Specifically,

Y represents a distance from a point on an aspheric curve to the optical axis;

Z represents a depth of the aspheric surface (i.e., a perpendicular distance between the point on the aspheric surface that is spaced by the distance Y from the optical axis and a tangent plane tangent to a vertex of the aspheric surface along the optical axis);

R represents a radius of curvature of the surface of the lens element;

K represents a conic constant;

$a_i$ represents an ith aspheric coefficient.

Respective aspheric coefficients of the object-side surfaces 25, 45 and 55 and the image-side surfaces 26, 46 and 56 in Equation (1) are as shown in FIG. 9. In FIG. 9, the row of number "25" (that is, the second row) indicates aspheric coefficients of the object-side surface 25 of the second lens element 2, and the other rows are defined in a similar manner. Because the fourth lens element 4 and the fifth lens element 5 are cemented together to form a cemented lens element, the aspherical coefficient of the image-side surface 46 may be deduced based on the aspherical coefficient of the object-side surface 55.

In addition, relations of important parameters in the optical imaging lens 10 of the first embodiment are as shown in FIG. 46. In FIG. 46, the unit of the values corresponding to the row "Fno" parameter (that is, the third row) is dimensionless, the unit of the values corresponding to the row "HFOV" parameter (that is, the fourth row) is degree (°), and the unit of the values corresponding to the rows "EFL" and "SR" to "AAG" parameters (that is, the second row and the fifth row to the thirtieth row) is millimeter, and the unit of the values corresponding to the rest of the rows is dimensionless. Value in the column under "the first embodiment" index (that is, the second column) in the table of FIG. 46 indicates relevant optical parameters of the first embodiment, and so on.

Specifically,

T1 is a thickness of the first lens element 1 along the optical axis I;

T2 is a thickness of the second lens element 2 along the optical axis I;

T3 is a thickness of the third lens element 3 along the optical axis I;

T4 is a thickness of the fourth lens element 4 along the optical axis I;

T5 is a thickness of the fifth lens element 5 along the optical axis I;

G12 is a distance between the image-side surface 16 of the first lens element 1 and the object-side surface 25 of the second lens element 2 along the optical axis I—in other words, an air gap between the first lens element 1 and the second lens element 2 along the optical axis I;

G23 is a distance between the image-side surface 26 of the second lens element 2 and the object-side surface 35 of the third lens element 3 along the optical axis I—in other words, an air gap between the second lens element 2 and the third lens element 3 along the optical axis I;

G34 is a distance between the image-side surface 36 of the third lens element 3 and the object-side surface 45 of the fourth lens element 4 along the optical axis I—in other words, an air gap between the third lens element 3 and the fourth lens element 4 along the optical axis I;

G45 is a distance between the image-side surface 46 of the fourth lens element 4 and the object-side surface 55 of the fifth lens element 5 along the optical axis I—in other words, an air gap between the fourth lens element 4 and the fifth lens element 5 along the optical axis I;

G5F is a distance between the image-side surface 56 of the fifth lens element 5 and the object-side surface 95 of the filter 9 along the optical axis I;

AAG represents a sum of the four air gaps G12, G23, G34, and G45—that is to say, a sum of the air gap G12 between the first lens element 1 and the second lens element 2 along the optical axis I, the air gap G23 between the second lens element 2 and the third lens element 3 along the optical axis I, the air gap G34 between the third lens element 3 and the fourth lens element 4 along the optical axis I, and the air gap G45 between the fourth lens element 4 and the fifth lens element 5 along the optical axis I;

ALT represents a sum of the five thicknesses T1, T2, T3, T4, and T5—that is to say, a sum of the thicknesses of the first lens element 1, the second lens element 2, the third lens element 3, the fourth lens element 4 and the fifth lens element 5 along the optical axis I;

TL represents a distance from the object-side surface 15 of the first lens element 1 to the image-side surface 56 of the fifth lens element 5 along the optical axis I;

TTL is a distance between the object-side surface 15 of the first lens element 1 and the image plane 99 along the optical axis I; and BFL is a distance between the image-side surface 56 of the fifth lens element 5 and the image plane 99 along the optical axis I;

HFOV is a half field of view of the optical imaging lens 10;

ImgH is an image height of the optical imaging lens 10;

EFL is an effective focal length of the optical imaging lens 10.

Besides, it is further defined as follows:

L2A1R is an effective radius of the object-side surface 25 of the second lens element 2;

SR is an effective radius of the aperture 0;

f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
V1 is an Abbe number of the first lens element 1;
V2 is an Abbe number of the second lens element 2;
V3 is an Abbe number of the third lens element 3;
V4 is an Abbe number of the fourth lens element 4; and
V5 is an Abbe number of the fifth lens element 5.

Referring to FIGS. 7A to 7D, FIG. 7A illustrates the longitudinal spherical aberration of the first embodiment, FIGS. 7B and 7C respectively illustrate field curvature aberrations on the image plane 99 in a sagittal direction and in a tangential direction at wavelengths of 470 nm, 555 nm and 650 nm in the first embodiment; and FIG. 7D illustrates a distortion aberration on the image plane 99 at wavelengths of 470 nm, 555 nm and 650 nm in the first embodiment. In FIG. 7A illustrating the longitudinal spherical aberration of the first embodiment, the curves representing the respective wavelengths are close to each other and near the middle position, indicating that off-axis rays of each wavelength at different heights are focused near the imaging point. The skew margin of the curve of each wavelength shows that the imaging point deviation of the off-axis ray at different heights is controlled within a range of ±0.030 mm. Therefore, the spherical aberration of the same wavelength is reduced in the first embodiment, and the distances among the three representing wavelengths are also close, indicating that imaging positions of rays of different wavelengths are concentrated. Hence, chromatic aberration is also suppressed.

In FIGS. 7B and 7C that illustrate the field curvature aberrations, field curvature aberrations of the three representative wavelengths within the entire field of view fall within ±0.08 mm, indicating that aberration of the optical system of the first embodiment can be effectively eliminated. In FIG. 7D, the diagram of distortion aberration shows that the distortion aberration of the first embodiment is maintained within a range of ±15%, indicating that the distortion aberration of the first embodiment complies with an imaging quality requirement of the optical system. Accordingly, compared to known optical lenses, the first embodiment is able to render a preferable imaging quality under a condition that that the system length is shortened to about 14.713 mm.

Figure 10:
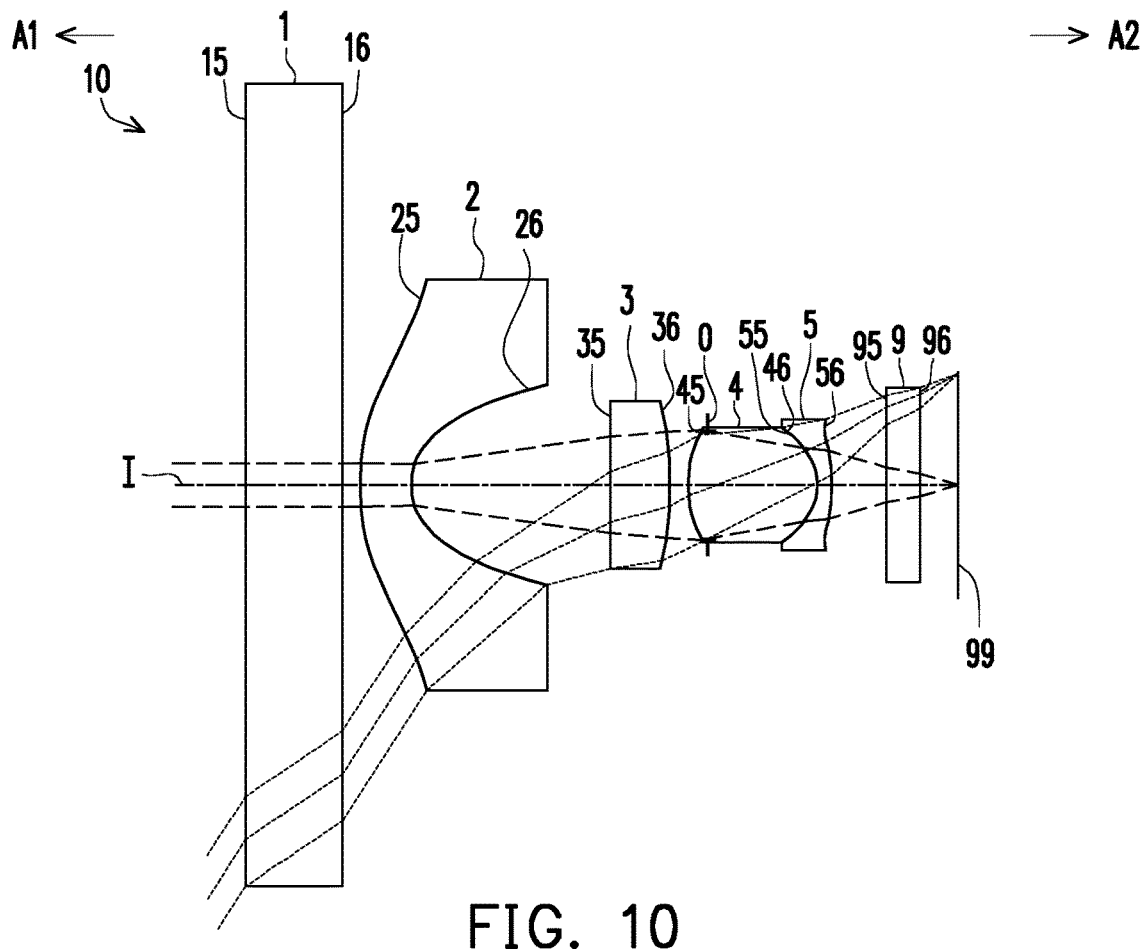
FIG. 10 is a schematic diagram illustrating an optical imaging lens according to a second embodiment of the invention.

FIG. 10 is a schematic diagram illustrating an optical imaging lens according to a second embodiment of the invention. FIGS. 11A to 11D illustrate longitudinal spherical aberration and various aberrations of the optical imaging lens according to the second embodiment. Referring to FIG. 10, the optical imaging lens 10 according to the second embodiment of the invention is roughly similar to that of the first embodiment, while the optical data, the aspheric coefficients and the parameters of the lens elements 1, 2, 3, 4, and 5 in the two embodiments are different to some extent. It is worth noting that reference numerals and notations denote surface shapes similar to those of the first embodiment are omitted in FIG. 10 so as to present the figure clearly.

Detailed optical data of the optical imaging lens 10 of the second embodiment are as shown in FIG. 12. Moreover, in the optical imaging lens 10 of the second embodiment, the EFL of the whole system is 1.667 mm, the HFOV is 57.089°, the Fno is 1.830, the system length is 14.997 mm, and the image height is 2.340 mm.

FIG. 13 shows aspheric coefficients of the object-side surfaces and the image-side surfaces of some lens elements in Equation (1) in the second embodiment.

In addition, relations of important parameters in the optical imaging lens 10 of the second embodiment are as shown in FIG. 46.

Figures 11A, 11B, 11C, 11D:
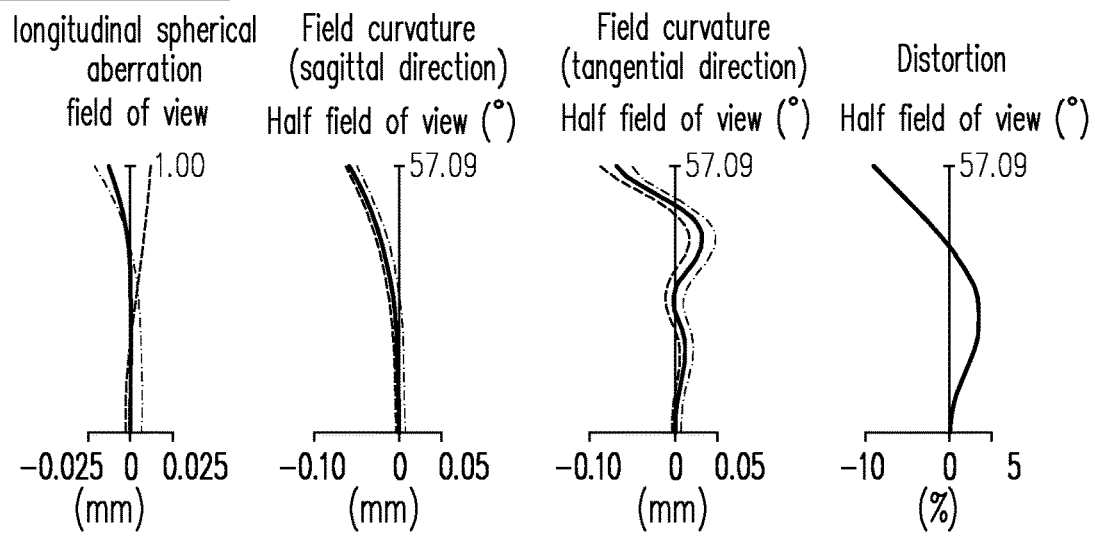
FIGS. 11A to 11D are diagrams illustrating a longitudinal spherical aberration and various aberrations of the optical imaging lens according to the second embodiment.

In FIG. 11A that illustrates the longitudinal spherical aberration of the second embodiment, deviations of the imaging points of the off-axis rays at different heights are controlled within a range of ±0.025 mm. In FIGS. 11B and 11C that illustrate the two field curvature aberrations, the field curvature aberrations of the three representative wavelengths within the entire field of view falls within ±0.10 mm. In FIG. 11D, the diagram of distortion aberration shows that the distortion aberration of the second embodiment is maintained within a range of ±10%. At a temperature of 20° C. in this embodiment, a focal shift of the optical imaging lens 10 is 0.0000 mm. The focal shift of the optical imaging lens 10 is −0.0081 mm at a temperature of −20° C. When the temperature rises to 80° C., the focal shift of the optical imaging lens 10 is 0.0346 mm. Accordingly, the second embodiment is able to render a desirable imaging quality with high thermal stability if compared with known optical lenses.

According to the above description, compared to the first embodiment, the advantage of the second embodiment is that the HFOV of the second embodiment is greater than the HFOV of the first embodiment. The range of distortion aberration in the second embodiment is smaller than the range of distortion aberration in the first embodiment. In addition, the absolute value of the focal shift of the second embodiment is smaller than the absolute value of the focal shift of the first embodiment whether an ambient temperature is −20° C. or 80° C.

FIG. 14 is a schematic diagram illustrating an optical imaging lens according to a third embodiment of the invention. FIGS. 15A to 15D illustrate longitudinal spherical aberration and various aberrations of the optical imaging lens according to the third embodiment. Referring to FIG. 14, the optical imaging lens 10 according to the third embodiment of the invention is roughly similar to that of the first embodiment, while the optical data, the aspheric coefficients and the parameters of the lens elements 1, 2, 3, 4, and 5 in the two embodiments are different to some extent. It is worth noting that reference numerals and notations denote surface shapes similar to those of the first embodiment are omitted in FIG. 14 so as to present the figure clearly.

Detailed optical data of the optical imaging lens 10 of the third embodiment are as shown in FIG. 16. Moreover, in the optical imaging lens 10 of the third embodiment, the EFL of the whole system is 2.015 mm, the HFOV is 45.313°, the Fno is 1.830, the system length is 14.473 mm, and the image height is 2.340 mm.

FIG. 17 shows aspheric coefficients of the object-side surfaces and the image-side surfaces of some lens elements in Equation (1) in the third embodiment.

In addition, relations of important parameters in the optical imaging lens 10 of the third embodiment are as shown in FIG. 46.

In FIG. 15A that illustrates the longitudinal spherical aberration of the third embodiment, deviations of the imaging points of the off-axis rays at different heights are controlled within a range of ±0.033 mm. In FIGS. 15B and 15C that illustrate the two field curvature aberrations, the field curvature aberrations of the three representative wavelengths within the entire field of view falls within ±0.05 mm. In FIG. 15D, the diagram of distortion aberration shows that the distortion aberration of the third embodiment is maintained within a range of ±18%. At a temperature of 20° C. in this embodiment, a focal shift of the optical imaging lens 10 is 0.0000 mm. The focal shift of the optical imaging lens 10 is −0.0089 mm at a temperature of −20° C. When the temperature rises to 80° C., the focal shift of the optical imaging lens 10 is 0.0258 mm. Accordingly, the third embodiment is able to render a desirable imaging quality with high thermal stability if compared with known optical lenses.

According to the above description, compared to the first embodiment, the advantage of the third embodiment is that the system length of the third embodiment is shorter than the system length of the first embodiment. The field curvature aberration of the third embodiment is smaller than the field curvature aberration of the first embodiment. In addition, the absolute value of the focal shift of the third embodiment is smaller than the absolute value of the focal shift of the first embodiment whether an ambient temperature is −20° C. or 80° C.

FIG. 18 is a schematic diagram illustrating an optical imaging lens according to a fourth embodiment of the invention. FIGS. 19A to 19D illustrate longitudinal spherical aberration and various aberrations of the optical imaging lens according to the fourth embodiment. Referring to FIG. 18, the optical imaging lens 10 according to the fourth embodiment of the invention is roughly similar to that of the first embodiment, while the optical data, the aspheric coefficients and the parameters of the lens elements 1, 2, 3, 4, and 5 in the two embodiments are different to some extent. It is worth noting that reference numerals and notations denote surface shapes similar to those of the first embodiment are omitted in FIG. 18 so as to present the figure clearly.

Detailed optical data of the optical imaging lens 10 of the fourth embodiment are as shown in FIG. 20. Moreover, in the optical imaging lens 10 of the fourth embodiment, the EFL of the whole system is 1.540 mm, the HFOV is 45.014°, the Fno is 1.830, the system length is 13.855 mm, and the image height is 2.340 mm.

FIG. 21 shows aspheric coefficients of the object-side surfaces and the image-side surfaces of some lens elements in Equation (1) in the fourth embodiment.

In addition, relations of important parameters in the optical imaging lens 10 of the fourth embodiment are as shown in FIG. 46.

In FIG. 19A that illustrates the longitudinal spherical aberration of the fourth embodiment, deviations of the imaging points of the off-axis rays at different heights are controlled within a range of ±0.033 mm. In FIGS. 19B and 19C that illustrate the two field curvature aberrations, the field curvature aberrations of the three representative wavelengths within the entire field of view falls within ±0.06 mm. In FIG. 19D, the diagram of distortion aberration shows that the distortion aberration of the fourth embodiment is maintained within a range of ±20%. At a temperature of 20° C. in this embodiment, a focal shift of the optical imaging lens 10 is 0.0000 mm. The focal shift of the optical imaging lens 10 is −0.0065 mm at a temperature of −20° C. When the temperature rises to 80° C., the focal shift of the optical imaging lens 10 is 0.0265 mm. Accordingly, the fourth embodiment is able to render a desirable imaging quality with high thermal stability if compared with known optical lenses.

According to the above description, compared to the first embodiment, the advantage of the fourth embodiment is that the system length of the fourth embodiment is shorter than the system length of the first embodiment. The field curvature aberration of the fourth embodiment is smaller than the field curvature aberration of the first embodiment. In addition, the absolute value of the focal shift of the fourth embodiment is smaller than the absolute value of the focal shift of the first embodiment whether an ambient temperature is −20° C. or 80° C.

FIG. 22 is a schematic diagram illustrating an optical imaging lens according to a fifth embodiment of the invention. FIGS. 23A to 23D illustrate longitudinal spherical aberration and various aberrations of the optical imaging lens according to the fifth embodiment. Referring to FIG. 22, the optical imaging lens 10 according to the fifth embodiment of the invention is roughly similar to that of the first embodiment, while the optical data, the aspheric coefficients and the parameters of the lens elements 1, 2, 3, 4, and 5 in the two embodiments are different to some extent. It is worth noting that reference numerals and notations denote surface shapes similar to those of the first embodiment are omitted in FIG. 22 so as to present the figure clearly.

Detailed optical data of the optical imaging lens 10 of the fifth embodiment are as shown in FIG. 24. Moreover, in the optical imaging lens 10 of the fifth embodiment, the EFL of the whole system is 2.712 mm, the HFOV is 34.179°, the Fno is 1.830, the system length is 14.473 mm, and the image height is 2.340 mm.

FIG. 25 shows aspheric coefficients of the object-side surfaces and the image-side surfaces of some lens elements in Equation (1) in the fifth embodiment.

In addition, relations of important parameters in the optical imaging lens 10 of the fifth embodiment are as shown in FIG. 46.

In FIG. 23A that illustrates the longitudinal spherical aberration of the fifth embodiment, deviations of the imaging points of the off-axis rays at different heights are controlled within a range of ±0.033 mm. In FIGS. 23B and 23C that illustrate the two field curvature aberrations, the field curvature aberrations of the three representative wavelengths within the entire field of view falls within ±0.08 mm. In FIG. 23D, the diagram of distortion aberration shows that the distortion aberration of the fifth embodiment is maintained within a range of ±28%. At a temperature of 20° C. in this embodiment, a focal shift of the optical imaging lens 10 is 0.0000 mm. The focal shift of the optical imaging lens 10 is −0.0035 mm at a temperature of −20° C. When the temperature rises to 80° C., the focal shift of the optical imaging lens 10 is 0.0393 mm. Accordingly, the fifth embodiment is able to render a desirable imaging quality with high thermal stability if compared with known optical lenses.

According to the above description, compared to the first embodiment, the advantage of the fifth embodiment is that the system length of the fifth embodiment is shorter than the system length of the first embodiment. In addition, the absolute value of the focal shift of the fifth embodiment is smaller than the absolute value of the focal shift of the first embodiment whether an ambient temperature is −20° C. or 80° C.

Figure 26:
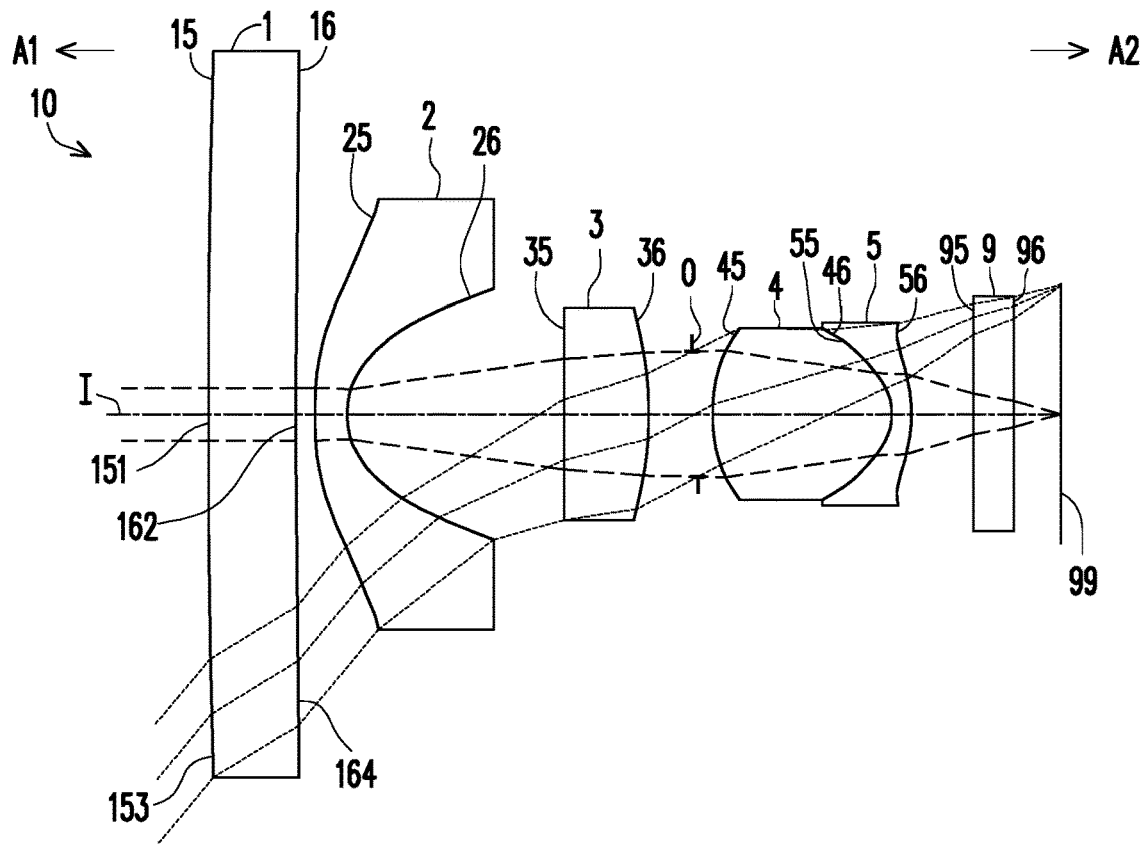
FIG. 26 is a schematic diagram illustrating an optical imaging lens according to a sixth embodiment of the invention.

FIG. 26 is a schematic diagram illustrating an optical imaging lens according to a sixth embodiment of the invention. FIGS. 27A to 27D illustrate longitudinal spherical aberration and various aberrations of the optical imaging lens according to the sixth embodiment. Referring to FIG. 26, the optical imaging lens 10 according to the sixth embodiment of the invention is roughly similar to that of the first embodiment, while the optical data, the aspheric coefficients and the parameters of the lens elements 1, 2, 3, 4, and 5 in the two embodiments are different to some extent. Moreover, in the sixth embodiment, the optical axis region 151 of the object-side surface 15 of the first lens element 1 is convex, and its periphery region 153 is convex. The optical axis region 162 of the image-side surface 16 of the first lens element 1 is concave, and its periphery region 164 is concave. It is worth noting that reference numerals and notations denote surface shapes similar to those of the first embodiment are omitted in FIG. 26 so as to present the figure clearly.

Detailed optical data of the optical imaging lens 10 of the sixth embodiment are as shown in FIG. 28. Moreover, in the optical imaging lens 10 of the sixth embodiment, the EFL of the whole system is 1.644 mm, the HFOV is 50.011°, the Fno is 1.830, the system length is 14.627 mm, and the image height is 2.340 mm.

FIG. 29 shows aspheric coefficients of the object-side surfaces and the image-side surfaces of some lens elements in Equation (1) in the sixth embodiment.

In addition, relations of important parameters in the optical imaging lens 10 of the sixth embodiment are as shown in FIG. 46.

Figures 27A, 27B, 27C, 27D:
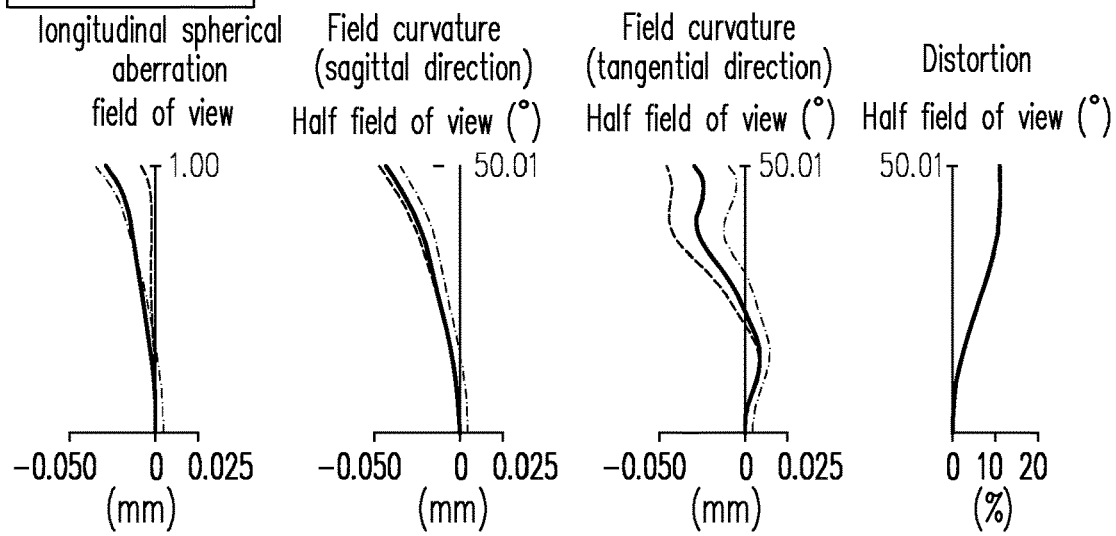
FIGS. 27A to 27D are diagrams illustrating a longitudinal spherical aberration and various aberrations of the optical imaging lens according to the sixth embodiment.

In FIG. 27A that illustrates the longitudinal spherical aberration of the sixth embodiment, deviations of the imaging points of the off-axis rays at different heights are controlled within a range of ±0.038 mm. In FIGS. 27B and 27C that illustrate the two field curvature aberrations, the field curvature aberrations of the three representative wavelengths within the entire field of view falls within ±0.05 mm. In FIG. 27D, the diagram of distortion aberration shows that the distortion aberration of the sixth embodiment is maintained within a range of ±11.3%. At a temperature of 20° C. in this embodiment, a focal shift of the optical imaging lens 10 is 0.0000 mm. The focal shift of the optical imaging lens 10 is −0.0067 mm at a temperature of −20° C. When the temperature rises to 80° C., the focal shift of the optical imaging lens 10 is 0.0324 mm. Accordingly, the sixth embodiment is able to render a desirable imaging quality with high thermal stability if compared with known optical lenses.

According to the above description, compared to the first embodiment, the advantage of the sixth embodiment is that the system length of the sixth embodiment is shorter than the system length of the first embodiment. The field curvature aberration of the sixth embodiment is smaller than the field curvature aberration of the first embodiment. The range of distortion aberration in the sixth embodiment is smaller than the range of distortion aberration in the first embodiment. In addition, the absolute value of the focal shift of the sixth embodiment is smaller than the absolute value of the focal shift of the first embodiment whether an ambient temperature is −20° C. or 80° C.

Figure 30:
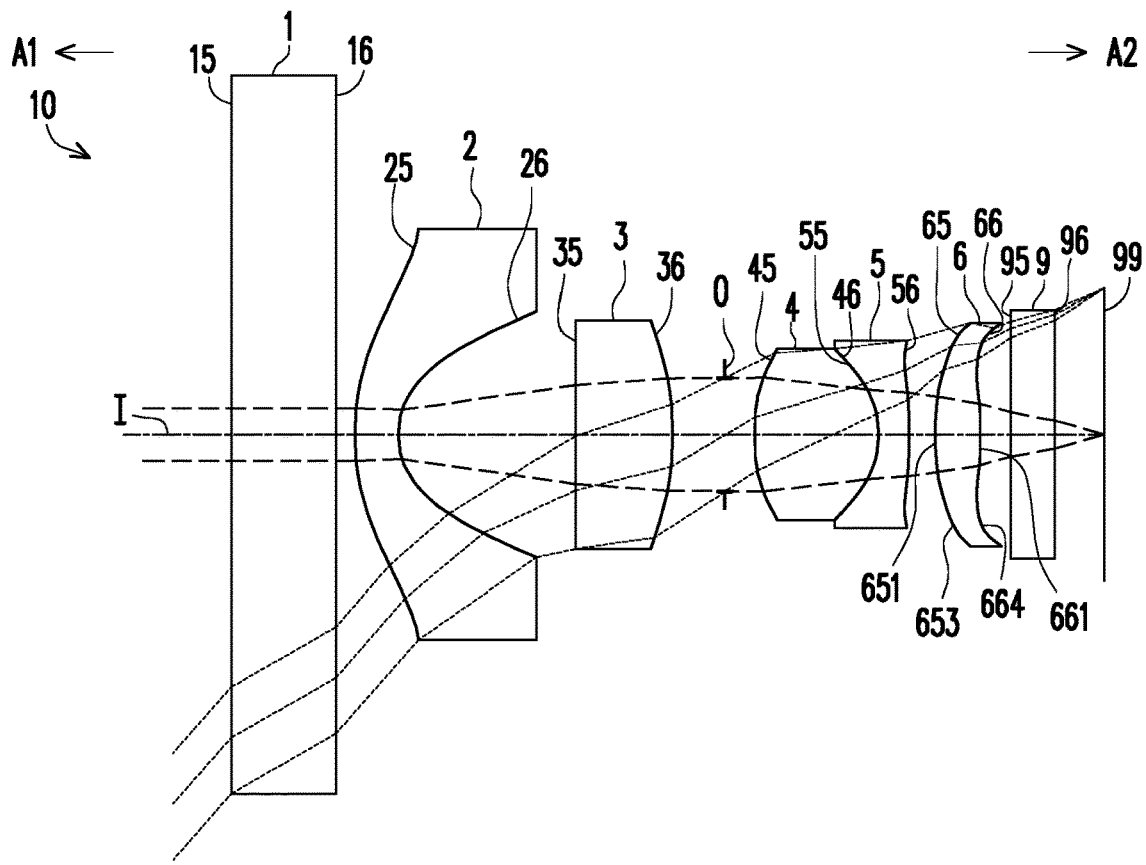
FIG. 30 is a schematic diagram illustrating an optical imaging lens according to a seventh embodiment of the invention.

FIG. 30 is a schematic diagram illustrating an optical imaging lens according to a seventh embodiment of the invention. FIGS. 31A to 31D illustrate longitudinal spherical aberration and various aberrations of the optical imaging lens according to the seventh embodiment. Referring to FIG. 30, the optical imaging lens 10 according to the seventh embodiment of the invention is roughly similar to that of the first embodiment, while differences therebetween may be listed as follows: the optical imaging lens 10 of the seventh embodiment of the invention includes the first lens element 1, the second lens element 2, the third lens element 3, the aperture 0, the fourth lens element 4, the fifth lens element 5, a sixth lens element 6, and the filter 9 arranged in sequence from an object side A1 to an image side A2 along an optical axis I of the optical imaging lens 10. When a ray emitted from an object to be shot enters the optical imaging lens 10 and passes sequentially through the first lens element 1, the second lens element 2, the third lens element 3, the aperture 0, the fourth lens element 4, the fifth lens element 5, the sixth lens element 6, and the filter 9, an image is formed on an image plane 99. Besides, the fifth lens element 5 has negative refracting power.

In the present embodiment, the sixth lens element 6 of the optical imaging lens 10 has an object-side surface 65 facing the object side A1 and allowing imaging rays to pass therethrough, and has an image-side surface 66 facing the image side A2 and allowing the imaging rays to pass therethrough.

The sixth lens element 6 is disposed between the fifth lens element 5 and the filter 9. The sixth lens element 6 is made of plastic and has positive refracting power. The optical axis region 651 of the object-side surface 65 of the sixth lens element 6 is convex, and its periphery region 653 is convex. The optical axis region 661 of the image-side surface 66 of the sixth lens element 6 is convex, and its periphery region 664 is concave. In the present embodiment, both the object-side surface 65 and the image-side surface 66 of the sixth lens element 6 are aspherical surfaces.

It is worth noting that reference numerals and notations denote surface shapes similar to those of the first embodiment are omitted in FIG. 30 so as to present the figure clearly.

In the optical imaging lens 10 of the seventh embodiment, high thermal stability is achieved. For example, at a temperature of 20° C. in this embodiment, a focal shift of the optical imaging lens 10 is 0.0000 mm. The focal shift of the optical imaging lens 10 is −0.0006 mm at a temperature of −20° C. When the temperature rises to 80° C., the focal shift of the optical imaging lens 10 is 0.0228 mm. The present invention is however not limited to this.

Detailed optical data of the seventh embodiment are as shown in FIG. 32. Moreover, in the optical imaging lens 10 of the seventh embodiment, the EFL of the whole system is 1.568 mm, the HFOV is 48.705°, the Fno is 1.830, the system length is 14.108 mm, and the image height is 2.340 mm.

Besides, in the seventh embodiment, a total of 8 surfaces (namely the object-side surfaces 25, 35, 45, and 65 and the image-side surfaces 26, 36, 46, and 66 of the second lens element 2, the fourth lens element 4, the fifth lens element 5 and the sixth lens element 6) are all aspheric surfaces, and the aspheric surfaces are defined based on Equation (1). Details in this regard will not be repeated in the following. Respective aspheric coefficients of the surfaces in Equation (1) are as shown in FIG. 33. For example, the row of "25" (that is, the second row) in FIG. 33 indicates aspheric coefficients of the object-side surface 25 of the second lens element 2, and the other rows are defined in a similar manner.

In addition, relations of important parameters in the optical imaging lens 10 of the seventh embodiment are as shown in FIG. 47. In FIG. 47, the unit of the values corresponding to the row "Fno" parameter (that is, the third row) is dimensionless, the unit of the values corresponding to the row "HFOV" parameter (that is, the fourth row) is degree (°), and the unit of the values corresponding to the rows "EFL" and "SR" to "AAG" parameters (that is, the second row and the fifth row to the thirtieth row) is millimeter, and the unit of the values corresponding to the rest of the rows is dimensionless. Value in the column under "the seventh embodiment" index (that is, the second column) in the table of FIG. 47 indicates relevant optical parameters of the seventh embodiment, and so on.

Definitions of the parameters in the first lens element 1, the second lens element 2, the third lens element 3, the fourth lens element 4 and the fifth lens element 5 of the seventh embodiment are approximately similar to the definitions of the parameters mentioned in abovementioned paragraphs, but differ in the following:

T6 is a thickness of the sixth lens element 6 along the optical axis I;

G56 is a distance between the image-side surface 56 of the fifth lens element 5 and the object-side surface 65 of the sixth lens element 6 along the optical axis I;

G6F is a distance between the image-side surface 66 of the sixth lens element 6 and the object-side surface 95 of the filter 9 along the optical axis I;

f6 is a focal length of the sixth lens element 6;

n6 is a refractive index of the sixth lens element 6; and

V6 is an Abbe number of the sixth lens element 6.

Figures 31A, 31B, 31C, 31D:
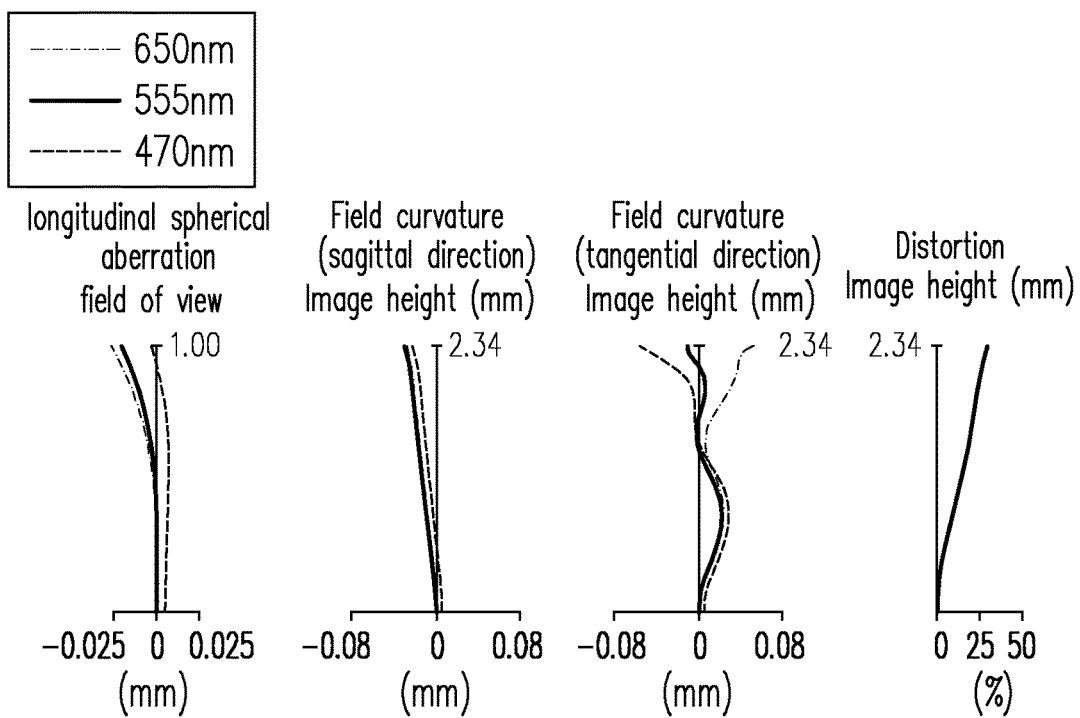
FIGS. 31A to 31D are diagrams illustrating a longitudinal spherical aberration and various aberrations of the optical imaging lens according to the seventh embodiment.

Referring to FIGS. 31A to 31D, FIG. 31A illustrates the longitudinal spherical aberration of the seventh embodiment when the wavelength of the seventh embodiment is 650 nm, 555 nm, and 470 nm, FIGS. 31B and 31C respectively illustrate field curvature aberrations on the image plane 99 in a sagittal direction and in a tangential direction at wavelengths of 470 nm, 555 nm and 650 nm in the seventh embodiment, and FIG. 31D illustrates the distortion aberration on the image plane 99 at wavelengths of 470 nm, 555 nm and 650 nm in the seventh embodiment. In FIG. 31A illustrating the longitudinal spherical aberration of the seventh embodiment, the curves representing the respective wavelengths are close to each other and near the middle position, indicating that off-axis rays of each wavelength at different heights are focused near the imaging point. The skew margin of the curve of each wavelength shows that the imaging point deviation of the off-axis ray at different heights is controlled within a range of ±0.030 mm. Therefore, the spherical aberration of the same wavelength is reduced in the seventh embodiment, and the distances among the three representing wavelengths are also close, indicating that imaging positions of rays of different wavelengths are concentrated. Hence, chromatic aberration is also suppressed.

In FIGS. 31B and 31C illustrating the field curvature aberrations, field curvature aberrations of the three representative wavelengths within the entire field of view fall within ±0.06 mm, indicating that aberration of the optical system of the seventh embodiment can be effectively eliminated. In FIG. 31D illustrating the distortion aberration, the distortion aberration of the seventh embodiment is maintained within a range of ±29.5%, indicating that the distortion aberration of the seventh embodiment satisfies an imaging quality requirement of an optical imaging lens. Hence, compared with known optical lenses, the seventh embodiment is able to render a preferable imaging quality under a condition that the system length is shortened to about 14.108 mm. Therefore, the seventh embodiment is able to reduce the length of the optical imaging lens while optical performance is also assured.

FIG. 34 is a schematic diagram illustrating an optical imaging lens according to an eighth embodiment of the invention, and FIGS. 35A to 35D illustrate longitudinal spherical aberration and various aberrations of the optical imaging lens according to the eighth embodiment. Referring to FIG. 34, the optical imaging lens 10 according to the eighth embodiment of the invention is roughly similar to that of the first embodiment, while differences therebetween may be listed as follows: the optical imaging lens 10 of the eighth embodiment of the invention includes the first lens element 1, the second lens element 2, the third lens element 3, the aperture 0, the fourth lens element 4, the fifth lens element 5, the sixth lens element 6, a seventh lens element 7, and the filter 9 arranged in sequence from an object side A1 to an image side A2 along an optical axis I of the optical imaging lens 10. When rays emitted from an object to be shot enter the optical imaging lens 10 and pass sequentially through the first lens element 1, the second lens element 2, the third lens element 3, the aperture 0, the fourth lens element 4, the fifth lens element 5, the sixth lens element 6, the seventh lens element 7, and the filter 9 and an image may be formed on the image plane 99.

In the present embodiment, the seventh lens element 7 of the optical imaging lens 10 has an object-side surface 75 facing toward the object side A1 and allowing the imaging rays to pass through and an image-side surface 76 facing toward the image side A2 and allowing the imaging rays to pass through.

The optical axis region 462 of the image-side surface 46 of the fourth lens element 4 is concave, and its periphery region 464 is concave.

The optical axis region 551 of the object-side surface 55 of the fifth lens element 5 is convex, and its periphery region 553 is convex. The optical axis region 561 of the image-side surface 56 of the fifth lens element 5 is convex, and its periphery region 563 is convex.

The sixth lens element 6 has negative refracting power. The optical axis region 652 of the object-side surface 65 of the sixth lens element 6 is concave, and its periphery region 654 is concave. The optical axis region 661 of the image-side surface 66 of the sixth lens element 6 is convex, and its periphery region 663 is convex.

The seventh lens element 7 has positive refracting power. The optical axis region 751 of the object-side surface 75 of the seventh lens element 7 is convex, and its periphery region 753 is convex. The optical axis region 761 of the image-side surface 76 of the seventh lens element 7 is convex, and its periphery region 763 is concave. In the present embodiment, both the object-side surface 75 and the image-side surface 76 of the seventh lens element 7 are aspherical surfaces.

The gap between the fifth lens element 5 and the sixth lens element 6 may be filled with glue, a film or a cemented material to form a cemented lens element.

It is worth noting that reference numerals and notations denote surface shapes similar to those of the first embodiment are omitted in FIG. 34 so as to present the figure clearly.

In the optical imaging lens 10 of the eighth embodiment, high thermal stability is achieved. For example, at a temperature of 20° C. in this embodiment, a focal shift of the optical imaging lens 10 is 0.0000 mm. The focal shift of the optical imaging lens 10 is −0.0008 mm at a temperature of −20° C. When the temperature rises to 80° C., the focal shift of the optical imaging lens 10 is 0.0240 mm. The present invention is however not limited to this.

Detailed optical data of the eighth embodiment are as shown in FIG. 36. Moreover, in the optical imaging lens 10 of the eighth embodiment, the EFL of the whole system is 1.626 mm, the HFOV is 48.236°, the Fno is 1.830, the system length is 14.633 mm, and the image height is 2.340 mm.

Besides, in the eighth embodiment, a total of 10 surfaces (namely the object-side surfaces 25, 45, 55, 65 and 75 and the image-side surfaces 26, 46, 56, 66 and 76 of the second lens element 2, the fourth lens element 4, the fifth lens element 5, the sixth lens element 6, and the seventh lens element 7 are all aspheric surfaces, and the aspheric surfaces are defined based on Equation (1). Details in this regard will not be repeated in the following. Respective aspheric coefficients of the surfaces in Equation (1) are as shown in FIG. 37. For example, the row of "25" (that is, the second row) in FIG. 37 indicates aspheric coefficients of the object-side surface 25 of the second lens element 2, and the other rows are defined in a similar manner. Because the fifth lens element 5 and the sixth lens element 6 are cemented together to form a cemented lens element, the aspherical coefficient of the image-side surface 56 may be deduced based on the aspherical coefficient of the object-side surface 65.

In addition, relations of important parameters in the optical imaging lens 10 of the eighth embodiment are as shown in FIG. 47.

Definitions of the parameters in the first lens element 1, the second lens element 2, the third lens element 3, the fourth lens element 4, the fifth lens element 5, and the sixth lens element 6 of the eighth embodiment are approximately similar to the definitions of the parameters mentioned in abovementioned paragraphs, but differ in the following:

T7 is a thickness of the seventh lens element 7 along the optical axis I;

G67 is a distance between the image-side surface 66 of the sixth lens element 6 and the object-side surface 75 of the seventh lens element 7 along the optical axis I;

G7F is a distance between the image-side surface 76 of the seventh lens element 7 and the object-side surface 95 of the filter 9 along the optical axis I;

f7 is a focal length of the seventh lens element 7;

n7 is a refractive index of the seventh lens element 7; and

V7 is an Abbe number of the seventh lens element 7.

Referring to FIGS. 35A to 35D, FIG. 35A illustrates the longitudinal spherical aberration of the eighth embodiment when the wavelength of the eighth embodiment is 650 nm, 555 nm, and 470 nm, FIGS. 35B and 35C respectively illustrate field curvature aberrations on the image plane 99 in a sagittal direction and in a tangential direction at wavelengths of 470 nm, 555 nm and 650 nm in the eighth embodiment, and FIG. 35D illustrates the distortion aberration on the image plane 99 at wavelengths of 470 nm, 555 nm and 650 nm in the eighth embodiment. In FIG. 35A illustrating the longitudinal spherical aberration of the eighth embodiment, the curves representing the respective wavelengths are close to each other and near the middle position, indicating that off-axis rays of each wavelength at different heights are focused near the imaging point. The skew margin of the curve of each wavelength shows that the imaging point deviation of the off-axis ray at different heights is controlled within a range of ±0.01 mm. Therefore, the spherical aberration of the same wavelength is reduced in the eighth embodiment, and the distances among the three representing wavelengths are also close, indicating that imaging positions of rays of different wavelengths are concentrated. Hence, chromatic aberration is also suppressed.

In FIGS. 35B and 35C illustrating the field curvature aberrations, field curvature aberrations of the three representative wavelengths within the entire field of view fall within ±0.033 mm, indicating that aberration of the optical system of the eighth embodiment can be effectively eliminated. In FIG. 35D illustrating the distortion aberration, the distortion aberration of the eighth embodiment is maintained within a range of ±27.6%, indicating that the distortion aberration of the eighth embodiment satisfies an imaging quality requirement of an optical imaging lens. Hence, compared with known optical lenses, the eighth embodiment is able to render a preferable imaging quality under a condition that the system length is shortened to about 14.633 mm. Therefore, the eighth embodiment is able to reduce the length of the optical imaging lens while optical performance is also assured.

Figure 38:
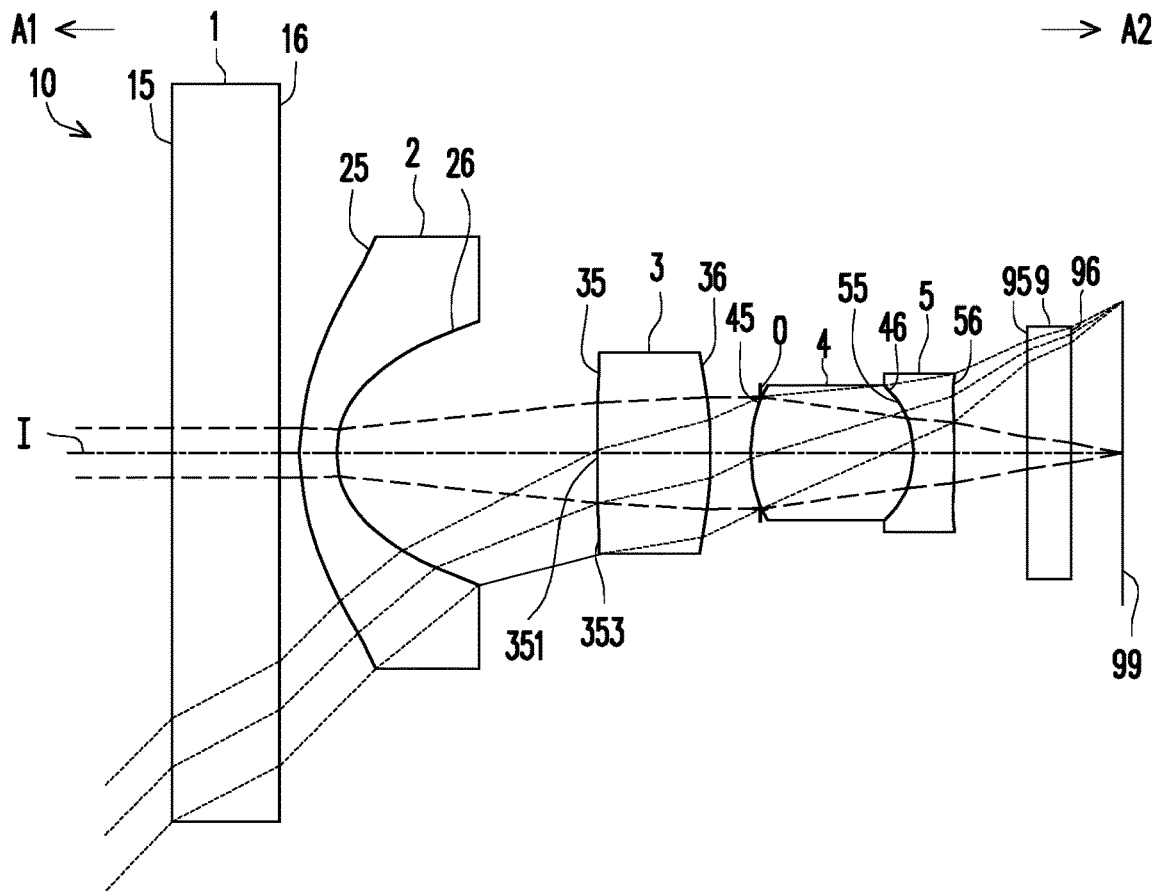
FIG. 38 is a schematic diagram illustrating an optical imaging lens according to a ninth embodiment of the invention.

FIG. 38 is a schematic diagram illustrating an optical imaging lens according to a ninth embodiment of the invention, and FIGS. 39A to 39D illustrate longitudinal spherical aberration and various aberrations of the optical imaging lens according to the ninth embodiment. Referring to FIG. 38, the optical imaging lens 10 according to the ninth embodiment of the invention is roughly similar to that of the first embodiment, while the optical data, the aspheric coefficients and the parameters of the lens elements 1, 2, 3, 4, and 5 in the two embodiments are different to some extent. Besides, in the ninth embodiment, the optical axis region 351 of the object-side surface 35 of the third lens element 3 is convex, and its periphery region 353 is convex. The fifth lens element 5 has negative refracting power. It is worth noting that reference numerals and notations denote surface shapes similar to those of the first embodiment are omitted in FIG. 38 so as to present the figure clearly.

Detailed optical data of the ninth embodiment are as shown in FIG. 40. Moreover, in the optical imaging lens 10 of the ninth embodiment, the EFL of the whole system is 2.046 mm, the HFOV is 44.641°, the Fno is 2.600, the system length is 14.951 mm, and the image height is 2.340 mm.

FIG. 41 shows aspheric coefficients of the object-side surfaces and the image-side surfaces of some lens elements in Equation (1) in the ninth embodiment.

In addition, relations of important parameters in the optical imaging lens 10 of the ninth embodiment are as shown in FIG. 47.

Figures 39A, 39B, 39C, 39D:
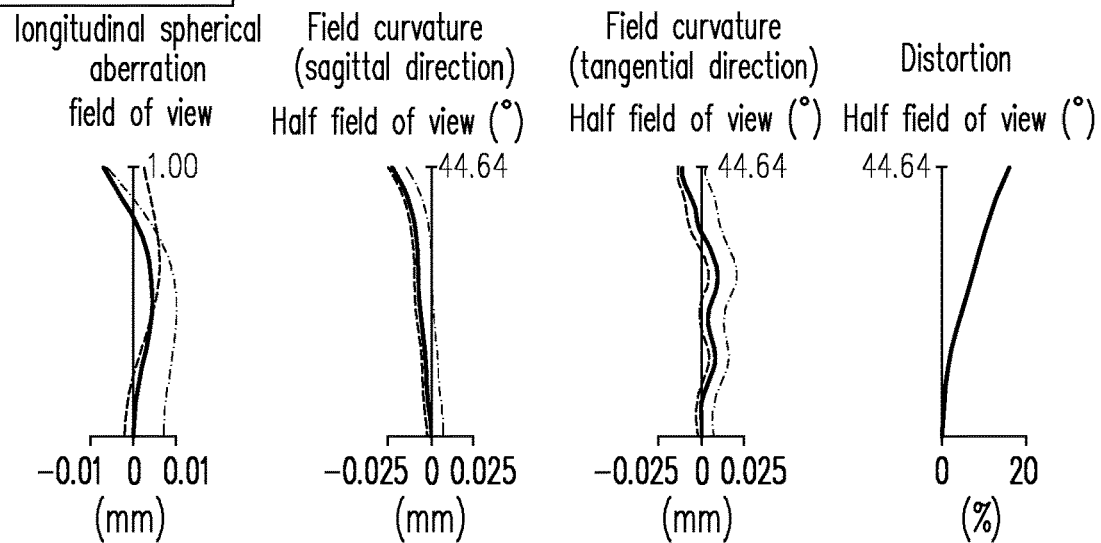
FIGS. 39A to 39D are diagrams illustrating a longitudinal spherical aberration and various aberrations of the optical imaging lens according to the ninth embodiment.

In FIG. 39A that illustrates the longitudinal spherical aberration of the ninth embodiment, deviations of the imaging points of the off-axis rays at different heights are controlled within a range of ±0.01 mm. In FIGS. 39B and 39C that illustrate the two field curvature aberrations, the field curvature aberrations of the three representative wavelengths within the entire field of view falls within ±0.025 mm. In FIG. 39D, the diagram of distortion aberration shows that the distortion aberration of the ninth embodiment is maintained within a range of ±15.6%. At a temperature of 20° C. in this embodiment, a focal shift of the optical imaging lens 10 is 0.0000 mm. The focal shift of the optical imaging lens 10 is −0.0024 mm at a temperature of −20° C. When the temperature rises to 80° C., the focal shift of the optical imaging lens 10 is 0.0269 mm. Accordingly, the ninth embodiment is able to render a desirable imaging quality with high thermal stability if compared with known optical lenses.

According to the above description, compared to the first embodiment, the advantage of the ninth embodiment is that the longitudinal spherical aberration of the ninth embodiment is smaller than the longitudinal spherical aberration of the first embodiment. The field curvature aberration of the ninth embodiment is smaller than the field curvature aberration of the first embodiment. In addition, the absolute value of the focal shift of the ninth embodiment is smaller than the absolute value of the focal shift of the first embodiment whether an ambient temperature is −20° C. or 80° C.

FIG. 42 is a schematic diagram illustrating an optical imaging lens according to a tenth embodiment of the invention, and FIGS. 43A to 43D illustrate longitudinal spherical aberration and various aberrations of the optical imaging lens according to the tenth embodiment. Referring to FIG. 42, the optical imaging lens 10 according to the tenth embodiment of the invention is roughly similar to that of the first embodiment, while the optical data, the aspheric coefficients and the parameters of the lens elements 1, 2, 3, 4, and 5 in the two embodiments are different to some extent. Besides, the optical axis region 351 of the object-side surface 35 of the third lens element 3 is convex, and its periphery region 353 is convex. The fourth lens element 4 has negative refracting power. The optical axis region 462 of the image-side surface 46 of the fourth lens element 4 is concave, and its periphery region 464 is concave. The optical axis region 551 of the object-side surface 55 of the fifth lens element 5 is convex, and its periphery region 553 is convex. The optical axis region 561 of the image-side surface 56 of the fifth lens element 5 is convex, and its periphery region 563 is convex. It is worth noting that reference numerals and notations denote surface shapes similar to those of the first embodiment are omitted in FIG. 42 so as to present the figure clearly.

Detailed optical data of the tenth embodiment are as shown in FIG. 44. Moreover, in the optical imaging lens 10 of the tenth embodiment, the EFL of the whole system is 2.255 mm, the HFOV is 52.800°, the Fno is 2.600, the system length is 14.997 mm, and the image height is 2.340 mm.

FIG. 45 shows aspheric coefficients of the object-side surfaces and the image-side surfaces of some lens elements in Equation (1) in the tenth embodiment.

In addition, relations of important parameters in the optical imaging lens 10 of the tenth embodiment are as shown in FIG. 47.

In FIG. 43A that illustrates the longitudinal spherical aberration of the tenth embodiment, deviations of the imaging points of the off-axis rays at different heights are controlled within a range of ±0.033 mm. In FIGS. 43B and 43C that illustrate the two field curvature aberrations, the field curvature aberrations of the three representative wavelengths within the entire field of view falls within ±0.041 mm. In FIG. 43D, the diagram of distortion aberration shows that the distortion aberration of the tenth embodiment is maintained within a range of ±24%. At a temperature of 20° C. in this embodiment, a focal shift of the optical imaging lens 10 is 0.0000 mm. The focal shift of the optical imaging lens 10 is −0.0018 mm at a temperature of −20° C. When the temperature rises to 80° C., the focal shift of the optical imaging lens 10 is 0.0037 mm. Accordingly, the tenth embodiment is able to render a desirable imaging quality with high thermal stability if compared with known optical lenses.

According to the above description, compared to the first embodiment, the advantage of the tenth embodiment is that the half field of view of the tenth embodiment is larger than the half field of view of the first embodiment. In addition, the absolute value of the focal shift of the tenth embodiment is smaller than the absolute value of the focal shift of the first embodiment whether an ambient temperature is −20° C. or 80° C.

As set forth above, in the optical imaging lens 10 of the invention, the first lens element 1 is arranged to be a lens element in a first order from the object side A1 to the image side A2. The refracting power of the first lens element 1 is equal to 0 inverse millimeter ($mm^{-1}$). The first lens element 1 is made of glass at a lower cost. The second lens element 2 is arranged to be a lens element having refracting power in a first order from the first lens element 1 to the image side A2. The second lens element 2 is made of plastic at a lower cost. The third lens element 3 is arranged to be a lens element having refracting power in a second order from the first lens element 1 to the image side A2. The refracting power of the third lens element 3 is positive. The fourth lens element 4 is arranged to be a lens element having refracting power in a first order from the aperture 0 to the image side A2; at least one of the object-side surface 45 and the image-side surface 46 of the fourth lens element 4 is aspherical. The fifth lens element 5 is arranged to be a lens element having refracting power in a second order from the aperture 0 to the image side A2. Both the object-side surface 55 and the image-side surface 56 of the fifth lens element 5 are aspherical surfaces. With the design mentioned above, the optical imaging lens 10 in the embodiments of the invention is advantageous for withstanding rigorous environmental tests (such as wind, rain, and sun), and is applicable to vehicle lens that should ensure thermal stability, wide half-field of view, low cost, and distortion aberration maintained within a range of ±30%.

The longitudinal spherical aberrations, astigmatic aberrations and distortion aberrations of the respective embodiments of the invention are all compliant with usage regulations. In addition, the off-axis rays of the three representative wavelengths (i.e., red, green and blue) at different heights are all concentrated at a vicinity of the imaging point. According to the deviation range of the respective curves, deviations of the imaging points of the off-axis rays at different heights are all controlled to achieve a desirable capability to suppress spherical aberration, aberration and distortion. The imaging quality data further suggest that distances among the three representative wavelengths (i.e., red, green and blue) are close to each other, indicating that in the invention, rays of different wavelengths are well concentrated under different circumstances. Therefore, an excellent dispersion suppressing capability is provided, and a desirable imaging quality is rendered.

The optical imaging lens 10 of the embodiments of the invention may satisfy $1.250 \leq L2A1R/ImgH \leq 2.200$ for the ease of keeping half field of view and system image height within a desired range to achieve wide half field of view.

The optical imaging lens 10 of the embodiments of the invention may satisfy $ImgH/SR \leq 2.800$ (which facilitate large aperture and system image height), and more preferably may satisfy $1.500 \leq ImgH/SR \leq 2.800$.

The optical imaging lens 10 of the embodiments of the invention may satisfy 5.000≤TTL/EFL may be satisfied for the ease of increasing half field of view, and more preferably may satisfy 5.000≤TTL/EFL≤9.000.

In the optical imaging lens 10 of the embodiments of the invention, the object-side surface 15 and the image-side surface 16 of the first lens element 1 may be further designed as planar surfaces. In this way, coating processes of mass production are performed at once before cut processes to avoid procedures such as qualitative analysis and molding processes after glass grinding processes. This may lessen manufacturing difficulties and reduce manufacturing costs significantly. The cost of the two glass (namely the first lens element 1 and the third lens element 3) equals the cost of a first glass lens element with negative refracting power on the market.

In the optical imaging lens 10 of the embodiments of the invention, the object-side surface 35 of the third lens element 3 may be further designed as a planar surface so as to increase tolerance assembly efficiency.

In the optical imaging lens 10 of the embodiments of the invention, the number of lenses having refracting power is not more than six in order to reduce the design difficulty and achieve cost reduction.

In the optical imaging lens 10 of the embodiments of the invention, the fourth lens element 4 and the fifth lens element 5 may be cemented together, and the image-side surface 46 of the fourth lens element 4 and the object-side surface 55 of the fifth lens element 5 are designed to be aspherical, thereby reducing various aberrations and improving image quality.

In the optical imaging lens 10 of the embodiments of the invention, some of the lens elements may be made of plastic to reduce the cost further. For example, some of the lens elements in the optical imaging lens 10 may satisfy any of the following conditions: 12.000≤V2/n2≤19.000 or 32.000≤V2/n2≤37.000, 12.000≤V4/n4≤19.000 or 32.000≤V4/n4≤37.000, 12.000≤V5/n5≤19.000 or 32.000≤V5/n5≤37.000. The material of a lens element which satisfy any of the above conditions is plastic of lower cost.

In the optical imaging lens 10 of the embodiments of the invention, the third lens element 3 may be made of glass, and the third lens element 3 may be disposed in front of the aperture 0 so that the absolute value of the focal shift of the optical imaging lens 10 at ambient temperature between −20° C. and 80° C. is less than 0.045 mm. For example, the third lens element 3 may satisfy any of the following conditions: V3/n3≤11.000, 20.000≤V3/n3≤31.000 or 38.000≤V3/n3≤66.000. The material of the third lens element 3 which satisfy any of the above conditions is glass of lower cost.

Referring to FIGS. 46 to 47, FIGS. 46 to 47 are tables showing the respective optical parameters from the first embodiment to the tenth embodiment.

Regarding the following conditions, at least one purpose is to maintain the EFL and the respective optical parameters at appropriate values to prevent any of the parameters from being excessively great (which may make it difficult to correct the aberrations of the whole optical imaging system) or to prevent any of the parameters from being excessively small (which may influence assembling or increase the manufacturing difficulty).

Specifically, the optical imaging lens 10 may satisfy (EFL+T5)/G23≤2.400, and more preferably may satisfy 0.200≤(EFL+T5)/G23≤2.400;

the optical imaging lens 10 may satisfy (EFL+T1)/T4≤4.700, and more preferably may satisfy 0.800≤(EFL+T1)/T4≤4.700;

the optical imaging lens 10 may satisfy (EFL+G34)/(T2+G12)≤3.800, and more preferably may satisfy 1.000≤(EFL+G34)/(T2+G12)≤3.800;

the optical imaging lens 10 may satisfy (EFL+T2)/(T1+T5)≤2.000, and more preferably may satisfy 0.500≤(EFL+T2)/(T1+T5)≤2.000;

the optical imaging lens 10 may satisfy (EFL+ALT)/AAG≤4.000, and more preferably may satisfy 1.100≤(EFL+ALT)/AAG≤4.000;

Regarding the following conditions, at least one purpose is to maintain the thicknesses of and gaps between the respective lens elements at appropriate values to prevent any of the parameters from being excessively great (which may make it difficult to miniaturize the whole optical imaging lens) or to prevent any of the parameters from being excessively small (which may influence assembling or increasing the manufacturing difficulty).

Specifically, the optical imaging lens 10 may satisfy TL/BFL≤6.000, and more preferably may satisfy 2.300≤TL/BFL≤6.000;

the optical imaging lens 10 may satisfy (T1+T5+G12+G45)/T3≤3.100, and more preferably may satisfy 0.800≤(T1+T5+G12+G45)/T3≤3.100;

the optical imaging lens 10 may satisfy (T1+T2+G12+G45)/G34≤9.200, and more preferably may satisfy 1.300≤(T1+T2+G12+G45)/G34≤9.200.

In addition, it is optional to select a random combination relationship of the parameter in the embodiment to increase limitation of the optical imaging lens for the ease of designing the optical imaging lens having the same structure in the invention.

Due to the unpredictability in the design of an optical system, with the framework of the embodiments of the invention, under the circumstances where the above-described conditions are satisfied, the optical imaging system according to the embodiments of the invention with shorter length, larger aperture, improved imaging quality, or better yield rate can be preferably achieved so as to improve the shortcoming of prior art.

All of the numerical ranges including the maximum and minimum values and the values therebetween which are obtained from the combining proportion relation of the optical parameters disclosed in each embodiment of the invention are implementable.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, an aperture, a fourth lens element and a fifth lens element arranged in sequence from an object side to an image side along an optical axis, wherein each of the first lens element through the fifth lens element has an object-side surface facing toward the object side and allowing imaging rays to pass through as well as an image-side surface facing toward the image side and allowing the imaging rays to pass through;

the first lens element is arranged to be a lens element of which refracting power being equal to 0 inverse millimeter (mm$^{-1}$) in a first order from the object side to the image side;

the second lens element is arranged to be a lens element having refracting power in a first order from the first lens element to the image side;

the third lens element is arranged to be a lens element having refracting power in a second order from the first lens element to the image side, the third lens element has positive refracting power;

the fourth lens element is arranged to be a lens element having refracting power in a first order from the aperture to the image side, at least one of the object-side surface of the fourth lens element and the image-side surface of the fourth lens element is aspherical surface; and the fifth lens element is arranged to be a lens element having refracting power in a second order from the aperture to the image side, both the object-side surface of the fifth lens element and the image-side surface of the fifth lens element are aspherical surfaces, wherein focal shift of the optical imaging lens at ambient temperature 80° C. is less than or equal to 0.0423 mm.

2. The optical imaging lens as claimed in claim 1, wherein the optical imaging lens further satisfies a condition as follows: 1.250≤L2A1R/ImgH≤2.200, wherein L2A1R is an effective radius of the object-side surface of the second lens element, and ImgH is an image height of the optical imaging lens.

3. The optical imaging lens as claimed in claim 1, wherein the optical imaging lens further satisfies any of conditions as follows:

$$12.000 \le V2/n2 \le 19.000 \text{ or } 32.000 \le V2/n2 \le 37.000,$$

wherein V2 is an Abbe number of the second lens element, and n2 is a refractive index of the second lens element.

4. The optical imaging lens as claimed in claim 1, wherein the optical imaging lens further satisfies any of conditions as follows:

$$V3/n3 \le 11.000, \ 20.000 \le V3/n3 \le 31.000, \text{ or } 38.000 \le V3/n3 \le 66.000,$$

wherein V3 is an Abbe number of the third lens element, and n3 is a refractive index of the third lens element.

5. The optical imaging lens as claimed in claim 1, wherein both the object-side surface of the first lens element and the image-side surface of the first lens element are planar surfaces.

6. The optical imaging lens as claimed in claim 1, wherein the optical imaging lens further satisfies a condition as follows: ImgH/SR≤2.800, wherein ImgH is an image height of the optical imaging lens, and SR is an effective radius of the aperture.

7. The optical imaging lens as claimed in claim 1, wherein the optical imaging lens further satisfies a condition as follows: (EFL+T5)/G23≤2.400, wherein EFL is an effective focal length of the optical imaging lens, T5 is a thickness of the fifth lens element along the optical axis, and G23 is an air gap between the second lens element and the third lens element along the optical axis.

8. The optical imaging lens as claimed in claim 1, wherein the optical imaging lens further satisfies a condition as follows: (EFL+G34)/(T2+G12)≤3.800, wherein EFL is an effective focal length of the optical imaging lens, G34 is an air gap between the third lens element and the fourth lens element along the optical axis, T2 is a thickness of the second lens element along the optical axis, and G12 is an air gap between the first lens element and the second lens element along the optical axis.

9. The optical imaging lens as claimed in claim 1, wherein the optical imaging lens further satisfies a condition as follows: (T1+T5+G12+G45)/T3≤3.100, wherein T1 is a thickness of the first lens element along the optical axis, T5 is a thickness of the fifth lens element along the optical axis, G12 is an air gap between the first lens element and the second lens element along the optical axis, G45 is a an air gap between the fourth lens element and the fifth lens element along the optical axis, and T3 is a thickness of third lens element along the optical axis.

10. The optical imaging lens as claimed in claim 1, wherein the optical imaging lens further satisfies a condition as follows: (EFL+ALT)/AAG≤4.000, wherein EFL is an effective focal length of the optical imaging lens, ALT is a sum of thicknesses of the first lens element, the second lens element, the third lens element, the fourth lens element and the fifth lens element along the optical axis, and AAG is a sum of an air gap between the first lens element and the second lens element along the optical axis, an air gap between the second lens element and the third lens element along the optical axis, an air gap between the third lens element and the fourth lens element along the optical axis, and an air gap between the fourth lens element and the fifth lens element along the optical axis.

11. An optical imaging lens, comprising a first lens element, a second lens element, a third lens element, an aperture, a fourth lens element and a fifth lens element arranged in sequence from an object side to an image side along an optical axis, wherein each of the first lens element through the fifth lens element has an object-side surface facing toward the object side and allowing imaging rays to pass through as well as an image-side surface facing toward the image side and allowing the imaging rays to pass through;

the first lens element is arranged to be a lens element of which refracting power being equal to 0 inverse millimeter (mm$^{-1}$) in a first order from the object-side to the image side;

the second lens element is arranged to be a lens element having refracting power in a first order from the first lens element to the image side;

the third lens element is arranged to be a lens element having refracting power in a second order from the first lens element to the image side;

the fourth lens element is arranged to be a lens element having refracting power in a first order from the aperture to the image side; at least one of the object-side surface of the fourth lens element and the image-side surface of the fourth lens element is aspherical surface;

the fifth lens element is arranged to be a lens element having refracting power in a second order from the aperture to the image side, both the object-side surface of the fifth lens element and the image-side surface of the fifth lens element are aspherical surfaces;

the optical imaging lens satisfies a condition as follows:

$$1.250 \le L2A1R/\text{ImgH} \le 2.200,$$

wherein L2A1R is an effective radius of the object-side surface of the second lens element, and ImgH is an image height of the optical imaging lens.

12. The optical imaging lens as claimed in claim 11, wherein an absolute value of focal shift of the optical imaging lens at ambient temperature between −20° C. and 80° C. is less than 0.045 mm.

13. The optical imaging lens as claimed in claim 11, wherein the optical imaging lens further satisfies any of conditions as follows:

$$12.000 \leq V4/n4 \leq 19.000 \text{ or } 32.000 \leq V4/n4 \leq 37.000,$$

wherein V4 is an Abbe number of the fourth lens element, and n4 is a refractive index of the fourth lens element.

14. The optical imaging lens as claimed in claim 11, wherein the optical imaging lens further satisfies any of conditions as follows:

$$12.000 \leq V5/n5 \leq 19.000 \text{ or } 32.000 \leq V5/n5 \leq 37.000,$$

wherein V5 is an Abbe number of the fifth lens element, and n5 is a refractive index of the fifth lens element.

15. The optical imaging lens as claimed in claim 11, wherein the object-side surface of the third lens element is a planar surface.

16. The optical imaging lens as claimed in claim 11, wherein the optical imaging lens further satisfies a condition as follows: 5.000≤TTL/EFL, wherein TTL is a distance between the object-side surface of the first lens element and an image plane along the optical axis, and EFL is an effective focal length of the optical imaging lens.

17. The optical imaging lens as claimed in claim 11, wherein the optical imaging lens further satisfies a condition as follows: (EFL+T1)/T4≤4.700, wherein EFL is an effective focal length of the optical imaging lens, T1 is a thickness of the first lens element along the optical axis, and T4 is a thickness of the fourth lens element along the optical axis.

18. The optical imaging lens as claimed in claim 11, wherein the optical imaging lens further satisfies a condition as follows: (EFL+T2)/(T1+T5)≤2.000, wherein EFL is an effective focal length of the optical imaging lens, T2 is a thickness of the second lens element along the optical axis, T1 is a thickness of the first lens element along the optical axis, and T5 is a thickness of the fifth lens element along the optical axis.

19. The optical imaging lens as claimed in claim 11, wherein the optical imaging lens further satisfies a condition as follows: (T1+T2+G12+G45)/G34≤9.200, wherein T1 is a thickness of the first lens element along the optical axis, T2 is a thickness of the second lens element along the optical axis, G12 is an air gap between the first lens element and the second lens element along the optical axis, G45 is an air gap between the fourth lens element and the fifth lens element along the optical axis, and G34 is an air gap between the third lens element and the fourth lens element along the optical axis.

20. The optical imaging lens as claimed in claim 11, wherein the optical imaging lens further satisfies a condition as follows: TL/BFL≤6.000, wherein TL is a distance from the object-side surface of the first lens element to the image-side surface of the fifth lens element along the optical axis, and BFL is a distance between the image-side surface of the fifth lens element and an image plane along the optical axis.

\* \* \* \* \*